Feb. 9, 1960 P. E. MERRITT ET AL 2,924,812

AUTOMATIC READING SYSTEM

Filed Oct. 31, 1957 4 Sheets-Sheet 1

PHILIP E. MERRITT
CARROLL M. STEELE
INVENTORS

BY

AUTOMATIC READING SYSTEM

Filed Oct. 31, 1957 4 Sheets-Sheet 2

PHILIP E. MERRITT
CARROLL M. STEELE
INVENTORS

BY
Louis P. Elberger
Howard M. Dustin

AUTOMATIC READING SYSTEM

Filed Oct. 31, 1957 4 Sheets-Sheet 3

PHILIP E. MERRITT
CARROLL M. STEELE
INVENTORS

BY
Lewis P. E. Wrege (signature)
Howard M. Dustin (signature)

PHILIP E. MERRITT
CARROLL M. STEETE
INVENTORS
BY
Lewis P. Elbinger
Howard M. Duston United States Patent Office 2,924,812

Patented Feb. 9, 1960

2,924,812

AUTOMATIC READING SYSTEM

Philip E. Merritt, Menlo Park, and Carroll M. Steele, Mountain View, Calif., assignors to General Electric Company, a corporation of New York Application October 31, 1957, Serial No. 693,773

41 Claims. (Cl. 340—149)

The present invention relates to apparatus for automatically reading human language and providing an output which can be employed in an information-handling machine.

This application is a continuation-in-part of U.S. patent application 572,308, filed March 19, 1956.

An application by Kenneth R. Eldredge, filed May 6, 1955, Serial No. 506,598, for an Automatic Reading System, which is assigned to the same assignee as the instant invention, describes and claims an arrangement whereby human language may be converted into machine language by, for example, printing the human language symbols in ink which is capable of being magnetized, passing these ink symbols in sequence past a magnetic transducer for generating electrical signals having a distinctive wave shape for each symbol, and recognizing the distinctive wave shapes by providing circuits adapted to energize different leads for providing a voltage pattern in a binary code which is representative of the symbol which was scanned by the magnetic transducer. The present invention, on the other hand, is concerned with providing alternative novel and useful circuits for recognizing the various symbols by providing individual recognition networks for different symbols being scanned by the magnetic transducer.

An object of the present invention is to provide a novel system for converting human language into machine language.

Another object of the present invention is to provide a human language reading system providing an output which can control a machine.

Another object of the present invention is to provide a simple and useful method and means for converting printed symbols into electrical signals representative thereof.

Another object of the present invention is to recognize one input wave shape and to distinguish it from a number of other possible input wave shapes by the use of novel circuits employing correlation techniques.

Another object of the present invention is to recognize one input wave shape and to distinguish it from a number of other possible input wave shapes by the use of novel circuits employing auto-correlation and cross-correlation techniques.

These and other objects of the invention are achieved in a system wherein the electrical signal derived from each symbol passing a magnetic transducer is applied to a delay line. Each symbol passing the magnetic transducer generates a distinctive wave shape. A plurality of networks, which may be termed correlation networks, are connected to sampling points spaced along the delay line. A different correlation network is provided for the different wave shapes which are to be applied to the system. Each correlation network is an electric circuit adapted to provide an output signal which is greater than that provided by any other one of the correlation networks when all networks receive identical input signals having the wave shape of a given one of the group of symbols to be recognized. The output signals of all of these networks are applied to circuits which detect the maximum correlation network output signal and in response thereto energize one of a number of leads corresponding to the symbol to be recognized. In this manner, recognition of human language may be readily achieved automatically.

While the novel and distinctive features of the invention are particularly pointed out in the appended claims, a more expository treatment of the invention, in principle and detail, together with additional objects and advantages thereof, is afforded by the following description and accompanying drawings of representative embodiments in which:

THEORY OF OPERATION

Figure 1:
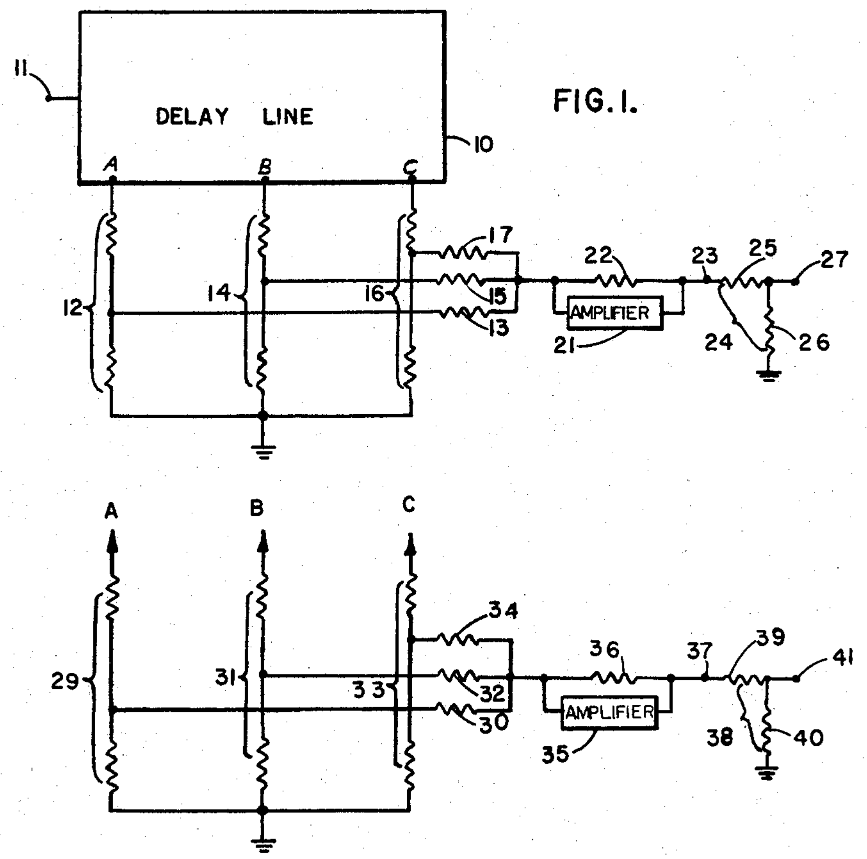
Figure 1 is a simplified schematic diagram of two correlation networks shown to assist in an understanding of this invention.

Figure 1 shows a simplified arrangement of a pair of correlation networks connected to a delay line 10, which is assumed to be lossless for the purpose of presenting the theory of operation. Delay line 10 is provided with an input terminal 11 and with the usual reflection-free termination. Three sampling points A, B, and C are provided along the delay line. One correlation network includes three voltage dividers 12, 14, 16 each connected between a respective sampling point and a reference voltage point, such as ground. This correlation network is adapted to sample a traveling wave of voltage on line 10 at three discrete points and to deliver an output signal which is greater than that delivered by any other network similarly connected to line 10 when this wave represents a particular one of the group of symbols to be identified. The voltage division ratio provided by each voltage divider of the correlation network is determined by the wave shape of the particular symbol to be recognized by that correlation network.

Figure 2:
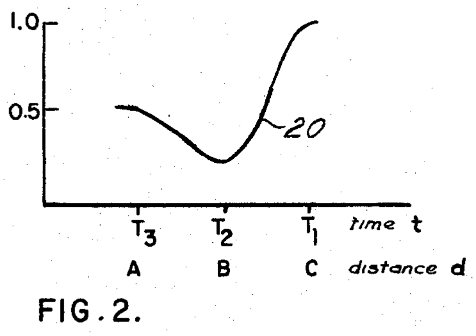
Figures 2 and 3 illustrate wave shapes of the type for which the correlation networks in Fig. 1 are designed to provide recognition.

Assume that the network of Fig. 1 is adapted to identify a voltage wave shape such as curve 20 in Fig. 2, which is derived from the symbol to be identified. This wave shape is delivered by the magnetic transducer when relative motion is provided between the transducer and the adjacent magnetized symbol. The instantaneous value of voltage delivered corresponds to the portion of the symbol passing the transducer at that instant. For example, the instaneous voltages appearing at times $t_1$, $t_2$, and $t_3$ respectively, may be those delivered by the transducer when scanning points near the leading edge, the center, and the trailing edge of the symbol. It will be noted that the wave shape shown in Fig. 2 is reversed from conventional presentations, since earlier delivered voltages appear farther to the right than later delivered voltages. This type of presentation will better serve to explain the operation of this invention, as it corresponds to the spatial distribution of the wave along the delay line.

The wave shape of Fig. 2 is applied to delay line terminal 11 and propagates therealong at a velocity determined by the parameters of the line. The voltage delivered at time $t_1$ is that which is applied to terminal 11 first and it is followed later by the voltages delivered at times $t_2$ and $t_3$. Thus, the voltages traveling along line 10 at points most distant from the input terminal 11 are those first delivered by the magnetic transducer. Curve 20 of Fig. 2 is employed for two different representations: (1) one representation depicts voltage delivered by the transducer as a function of time, wherein time decreases to the right, as shown by the upper abscissal index, $t$. In this drawing the voltages have been normalized to a maximum value of 1.0. That is, the maximum value of the portion of the wave shape to be sampled is set at 1.0 and all other portions of the wave shape are reduced proportionately; and (2) the other representation depicts the distribution of voltage along the delay line at one instant of time subsequent to $t_3$ as a function of distance along the delay line, shown by the lower abscissal index, $d$. At a later instant of time the curve would be shifted to the right in the diagram, since wave propagation is to the right. This second representation is, therefore, that of a traveling wave of voltage on line 10. In the particular instant that the traveling wave is illustrated the voltages delivered by the transducer at times $t_1$, $t_2$, and $t_3$ have arrived at respective sampling points C, B, and A. At this instant the normalized voltages at points A, B, and C have the respective values 0.50, 0.25, and 1.00.

The voltage division ratio which is provided by each divider of the upper resistance network of Fig. 1 is numerically equal to the value of normalized voltage provided at the corresponding sampling point at the moment the wave shape of Fig. 2 is in the illustrated position. This position will be termed the "reference" position. Thus, voltage divider 12 delivers a voltage at its tapped point equal to one-half the voltage sampled at point A, voltage divider 14 delivers a voltage at its tapped point equal to one-quarter the voltage sampled at point B, and voltage divider 16 delivers the entire value of voltage sampled at point C. (In this example voltage may be taken directly from point C since its voltage divider 16 has a ratio of unity.) Therefore, the values of voltage delivered by voltage dividers 12, 14, and 16 are respectively $0.50\times0.50=0.25$; $0.25\times0.25=0.0625$; and $1.0\times1.0=1.0$.

Referring again to Fig. 1, the respective voltages delivered at the tapped points of dividers 12, 14 and 16 are summed algebraically by means of a summing network connected to the tapped points. Three resistors 13, 15, and 17 are connected together at one of their terminals. The other terminal of each of resistors 13, 15, and 17 is connected to a respective tapped point of voltage dividers 12, 14, and 16. A high gain amplifier 21 and a resistor 22 are connected in parallel between the common connection point of resistors 13, 15, and 17 and a terminal 23. If resistors 13, 15, 17 and 22 each have the same value of resistance, the voltage delivered at terminal 23 is the algebraic sum of the voltages provided at the tapped points of the three voltage dividers. If this common resistance value of resistors 13, 15, 17 and 22 is large compared with the resistance values of voltage dividers 12, 14, and 16, the voltages provided at the tapped points of these dividers will be substantially unaffected by the inclusion of the summing network described. (A summing amplifier as shown is described in a book by G. A. Korn, "Electronic Analog Computers," p. 11, McGraw-Hill Book Co., Inc., New York, 1952.) At the instant the curve in Fig. 2 is depicted, the summation voltage supplied at terminal 23 has the value of 1.3125, which is the highest voltage supplied at terminal 23 during the passage of the wave of Fig. 2 along delay line 10.

A voltage divider 24 (Fig. 1) comprising the series-connected resistors 25 and 26 is connected between terminal 23 and ground. Divider 24 is adapted to attenuate the voltage of terminal 23 by a predetermined amount and to supply this attenuated voltage at output terminal 27, which is connected to the common junction point of resistors 25 and 26. Specifically, divider 24 is designed to multiply the voltage at terminal 23 by a value inversely proportional to the square root of the sum of the squares of the voltage division ratios of the voltage divider network, in this instance the voltage division ratios of voltage dividers 12, 14, and 16; that is, $$V_{27}=V_{23}\times\frac{k}{\sqrt{r_{12}^2+r_{14}^2+r_{16}^2}} \quad (1)$$

where V represents a terminal voltage, $r$ is a voltage division ratio, and $k$ is a constant of proportionality. For the numerical values of the example described above, $$V_{27}=V_{23}\frac{k}{\sqrt{1.3125}}=0.873kV_{23} \quad (2)$$

In this particular instance, $k$ may be set equal to unity, so that the voltage division ratio of divider 24 is 0.873.

Figure 3:
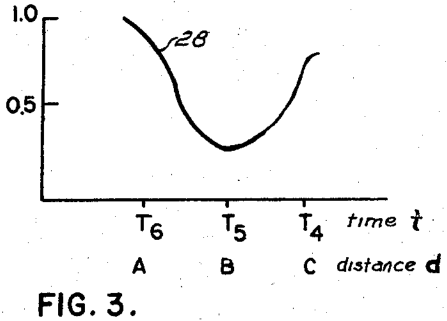

Assume, now, that the reading system being designed is expected to also read and recognize another and different symbol which provides a normalized voltage wave shape, such as curve 28, shown in Fig. 3. In such case another correlation network such as shown at the bottom of Fig. 1 must be provided and must be similarly connected to sampling points A, B, and C. The reference position for this wave in the delay line is as shown in Fig. 3, and the normalized voltages at points A, B, and C have the respective values 1.00, 0.25 and 0.75. Thus, the correlation network including voltage dividers 29, 31 and 33 is adapted to recognize wave shape 28. These dividers are connected to points A, B, and C of the delay line 10 and must provide the respective voltage division ratios 1.00, 0.25, and 0.75. In the manner above described, the respective voltages delivered at the tapped points of dividers 29, 31, and 33 are summed algebraically. Three resistors 30, 32, and 34 are each connected at one end thereof to a respective tapped point of voltage dividers 29, 31, and 33 and at the other end thereof to one common connection point of a parallel-connected high gain amplifier 35 and resistor 36. Resistors 30, 32, 34, and 36 each have the same value of resistance, which is large compared to that of voltage dividers 29, 31, and 33. The summation voltage supplied at terminal 37 is attenuated by a voltage divider 38 comprising the series-connected resistors 39 and 40 and is delivered at an output terminal 41 connected to the common junction point of resistors 39 and 40. Divider 38 is designed to multiply the voltage at terminal 37 by a factor derived in accordance with the theory on which Equation 1 was based. For curve 28 of Fig. 3, $$V_{41}=0.784kV_{37} \quad (3)$$

Since the value of $k$ of Equation 2 was set equal to unity, the value of $k$ of Equation 3 is set equal to unity, so that the voltage division ratio of divider 38 is 0.784.

To illustrate the utility of the function of dividers 24 and 38, consider the following example: Assume that wave shape 20 of Fig. 2 is applied to terminal 11 of delay line 10. Both voltage divider networks shown in Fig. 1 are connected to line 10 at its sampling points. The voltages at terminals 23 and 37 will each be 1.3125. The voltage at output terminal 27 is 1.146 and at output terminal 41 is 1.029, and, therefore, the system recognizes wave shape 20 by delivering the larger output voltage at terminal 27. Assume, now, that wave shape 28 of Fig. 3 is applied to line terminal 11. The voltages at terminals 23 and 37 will be respectively 1.3125 and 1.6250. The voltage at output terminal 27 is 1.146 and at output terminal 41 is 1.273, and, therefore, the system recognizes wave shape 28 by delivering the larger output voltage at terminal 41.

A summary of the general technique of the design and operation of the reading apparatus shown in Fig. 1 follows. Each wave shape to be recognized is sampled simultaneously at a number of discrete points by applying the wave shape to a delay line provided with a plurality of sampling points therealong. A voltage divider is connected between each sampling point and ground and has its voltage division ratio adjusted to be numerically equal to the normalized value of voltage provided at the corresponding sampling point when the wave is in its reference position. A means is provided for summing the voltages delivered at all these voltage divider tapped points and this summation voltage output is applied to another voltage divider, which reduces the summation voltage in accordance with the theory on which Equation 1 was based. When a number of such networks, each having a design conditioned by a different wave shape, are connected in parallel to the delay line, and a particular wave shape is applied to the delay line, the largest output voltage will be delivered by the network having a design conditioned by that wave shape. Thus, each one of these networks is a correlation network in accordance with the previously described function of a correlation network.

CONCEPT OF CORRELATION

The concept of correlation will now be employed in discussing the operation of the apparatus of Fig. 1 in mathematical notation.

If $a_1, a_2, \ldots a_n$ are the numbers of one set and $b_1, b_2, \ldots b_n$ are the numbers of another set, then the coefficient of correlation between these two sets is, by definition, $$(4)\qquad \Omega=\frac{\sum_1^n a_ib_i}{\sqrt{\sum_1^n a_i^2\sum_1^n b_i^2}}$$

This quantity must lie betweeen 1 and −1. (N. Wiener, "Extrapolation, Interpolation, and Smoothing of Stationary Time Series," p. 4, John Wiley & Sons, Inc., New York, 1949.) Mathematically, Ω be interpreted as the cosine of the angle between the two $n$-dimensional vectors $\bar{A}$ and $\bar{B}$, where $a_1, a_2, \ldots a_n$ and $b_1, b_2, \ldots b_n$ represent their respective components. The numerator of Equation 4 may be interpreted as the scalar product of the two vectors $\bar{A}$ and $\bar{B}$; i.e., $$(5)\qquad \bar{A}\cdot\bar{B}=\sum_1^n a_ib_i=AB\cos\theta$$

and the denominator as the arithmetic product of the magnitudes of the two vectors. In Equation 5, the term $\theta$ is the angle between the vectors $\bar{A}$ and $\bar{B}$ and the terms A and B are the respective scalar magnitudes of the vectors $\bar{A}$ and $\bar{B}$. (L. A. Pipes, "Applied Mathematics for Engineers and Physicists," chap. XV, McGraw-Hill Book Co., Inc., New York, 1946.) Equation 4 may thus be rewritten as $$(6)\qquad \Omega=\frac{\bar{A}\cdot\bar{B}}{AB}=\cos\theta$$

Inspection of Equation 6 indicates that Ω is greatest when $\bar{A}$ and $\bar{B}$ are the same vector; that is $\theta=0°$ and $\cos\theta=1$ (H. Lass, "Vector and Tensor Analysis," p. 282, McGraw-Hill Book Co., New York, 1950).

For many purposes the quantity $$\sum_1^n a_ib_i$$

in Equation 4 may be considered as the correlation.

The magnitude of any vector divided by the square root of the sum of the squares of its components is unity. Therefore, $$(7)\qquad \frac{A}{\sqrt{\sum_1^n a_i^2}}=\frac{B}{\sqrt{\sum_1^n b_i^2}}=1$$

or $$(8)\qquad \frac{cA}{\sqrt{\sum_1^n a_i^2}}=\frac{cB}{\sqrt{\sum_1^n b_i^2}}$$

where $c$ is an arbitrary constant.

Consider, now, one of the set of voltage divider networks which is connected to all $n$ sampling points of a delay line. Let this voltage divider network be designated as voltage divider network $\alpha$ of correlation network $\alpha$. Each ratio of the set of $n$ voltage division ratios provided by voltage divider network $\alpha$ may be considered to be one of the $n$ components of vector $\bar{A}$. The $n$ sampled portions of any voltage wave shape similar in form to the wave shape which conditioned the design of voltage divider network $\alpha$ may, therefore, be designated by a vector proportional to $\bar{A}$, i.e. $m\bar{A}$. These $n$ sampled portions of a wave shape are sufficient for its complete definition, provided $n\geqq 2WT$, where W is its highest frequency component and T is the duration of the wave shape (P. M. Woodward, "Probability and Information Theory, With Applications to Radar," p. 34, McGraw-Hill Book Co., Inc., New York, 1953). By applying the wave shape denoted by the components of $m\bar{A}$ to voltage divider network $\alpha$ and by summing the voltages delivered at all tapped points of the voltage dividers, there results $$(9)\qquad V\alpha=ma_1^2+ma_2^2+\ldots+ma_n^2=m\bar{A}\cdot\bar{A}$$

Connected in parallel to each sampling point is a voltage divider of each correlation network designed to recognize a different wave shape. Let the network of voltage dividers for any one of these correlation networks be designated as voltage divider network $\beta$ of correlation network $\beta$ and the voltage division ratios of the set be designated as the $n$ components of vector $\bar{B}$.

When the wave shape designated by $m\bar{A}$ is applied to voltage divider network $\beta$ and the tapped point voltages are summed, there results $$(10)\qquad V\beta=ma_1b_1+ma_2b_2+\ldots+ma_nb_n=m\bar{A}\cdot\bar{B}$$

The output voltage from correlation network $\alpha$ is that of Equation 9 reduced by a factor similar to that indicated by Equation 1; that is, $$(11)\qquad V_{0\alpha}=\frac{km\bar{A}\cdot\bar{A}}{\sqrt{\sum_1^n a_i^2}}$$

It should be noted that although the denominator of Equation 11 may be interpreted to be the magnitude of the vector $\bar{A}$, physically it is proportional to the square root of the energy of the wave shape denoted by the components of $m\bar{A}$. This is evident since each term $a_i^2$ represents voltage squared.

The output voltage from correlation network $\beta$ is that of Equation 10 reduced by a factor similar to that indicated by Equation 1; that is $$(12)\qquad V_{0\beta}=\frac{km\bar{A}\cdot\bar{B}}{\sqrt{\sum_1^n b_i^2}}$$

If Equation 11 is compared with Equation 4 and its equivalent Equation 6, the similarity is noted. In this instance the number sets represented by the two vectors $\bar{A}$ correspond respectively to the sampled voltages of a wave and to the voltage division ratios of the network designed to recognize that wave. Therefore, voltage $V_{0\alpha}$ may be termed the coefficient of auto-correlation. Similarly a comparison may be made between Equations 12 and 4. In this instance the number set of vector $\bar{A}$ represents the sampled voltages of a particular wave shape and the number set of vector $\bar{B}$ represents the voltage division ratios of a network designed to recognize another wave shape. Therefore, $V_{0\beta}$ may be termed the coefficient of cross-correlation. It will now be shown that the coefficient of auto-correlation given by Equation 11 is always greater than the coefficient of cross-correlation given by Equation 12, by proving that $$(13)\qquad \frac{km\bar{A}\cdot\bar{A}}{\sqrt{\sum_1^n a_i^2}} > \frac{km\bar{A}\cdot\bar{B}}{\sqrt{\sum_1^n b_i^2}}$$

Equation 13 may be rewritten as:

$$(14)\qquad \frac{kmA^2}{\sqrt{\sum_1^n a_i^2}} > \frac{kmAB\cos\theta}{\sqrt{\sum_1^n b_i^2}}$$

By comparing Equation 14 with Equation 8, there results $$(15)\qquad A > A\cos\theta$$

Since each correlation network is to recognize a different wave shape, $\bar{A}$ is never parallel to $\bar{B}$, $\cos\theta<1$, and the proof of Equation 13 is established.

Therefore, a wave shape applied simultaneously to a set of correlation networks designed in accordance with the principles above-described will be recognized by virtue of the greatest output voltage being delivered from the network whose design was conditioned by this wave shape.

The broad utility of this invention will now be illustrated by continuing the above-developed analysis to show that the auto-correlation coefficient, or output voltage, is greater than any other correlation coefficient of the network when the wave shape being recognized is so positioned in the delay line that the voltages delivered at the $n$ sampling points define the $n$ coordinates of the vector $k\bar{A}$, where $\bar{A}$ is a vector whose $n$ coordinates are defined by the voltage dividers of the auto-correlating network for that wave shape. It is this position of the wave shape in the delay line that has previously been referred to as the reference position. The time when the wave is positioned in the reference position will be designated as $\tau$, and the corresponding auto-correlation and cross-correlation voltages will be designated respectively as $V_{0\alpha}(\tau)$ and $V_{0\beta}(\tau)$. It has already been shown in Equations 13, 14, and 15 that $$(16)\qquad V_{0\alpha}(\tau) > V_{0\beta}(\tau)$$

Consider the auto-correlation voltage at any time other than $\tau$ $$(17)\qquad V_{0\alpha}(\tau\pm t) = \frac{km\sum_{i=1}^n a_{i+j}a_i}{\sqrt{\sum_1^n a_i^2}}$$

where $j$ is a function of the displacement of the wave shape with respect to its position at $\tau$, and $ma_{i+j}$ represents the value of wave shape voltage sampled at the corresponding voltage divider whose vector component is $a_i$. The summation term of the numerator of Equation 17 may be considered to be the scalar product of two non-parallel vectors of equal amplitude, since each vector represents the same wave shape, but like components are not multiplied together. Therefore, Equation 17 may be written as $$(18)\qquad V_{0\alpha}(\tau\pm t) = \frac{km\bar{A}(\tau)\cdot\bar{A}(\tau\pm t)}{\sqrt{\sum_1^n a_i^2}} = \frac{kmA^2\cos\theta_1}{\sqrt{\sum_1^n a_i^2}}$$

where $\theta_1$ is the angle between $\bar{A}(\tau)$ and $\bar{A}(\tau\pm t)$. Comparing Equation 18 with Equation 14 it is seen that $$(19)\qquad V_{0\alpha}(\tau) > V_{0\alpha}(\tau\pm t)$$

Consider the cross-correlation voltage at any time other than $\tau$ $$(20)\qquad V_{0\beta}(\tau\pm t) = \frac{km\sum_{i=1}^n a_{i+j}b_i}{\sqrt{\sum_1^n b_i^2}}$$

where $ma_{i+j}$ represents the value of wave shape voltage sampled at the corresponding voltage divider whose vector component is $b_i$.

Since the components of $\bar{B}$ were not linearly related to those of $\bar{A}$, vectors $\bar{A}$ and $\bar{B}$ are necessarily not parallel. Therefore Equation 20 may be written as $$(21)\qquad V_{0\beta}(\tau\pm t) = \frac{km\bar{B}(\tau)\cdot\bar{A}(\tau\pm t)}{\sqrt{\sum_1^n b_i^2}} = \frac{kmAB\cos\theta_2}{\sqrt{\sum_1^n b_i^2}}$$

where $\theta_2$ is the angle between $\bar{B}(\tau)$ and $\bar{A}(\tau\pm t)$. Comparing Equation 21 with Equation 14 it is seen that $$(22)\qquad V_{0\alpha}(\tau) > V_{0\beta}(\tau\pm t)$$

Therefore Equations 16, 19, and 22 show that the auto-correlation voltage developed at time $\tau$ is greater than any other correlation voltage developed by the above-described apparatus. Consequently, a wave shape may be recognized by determining the maximum voltage developed by each correlation network as the wave shape passes through the delay line, by comparing these maximum voltages, and by identifying the network producing the greatest maximum voltage.

It is to be noted that the above analysis is based on the simultaneous application to the correlation system of no more than one wave shape, or part thereof, for which a correlation network is provided. In the event that this condition is not fulfilled, steps must be taken to insure that the output signals from the system are properly interpreted. These steps will be described later.

THE RESISTANCE NETWORKS

In designing the correlation networks of this invention the various wave shapes, which are derived by scanning the different symbols, must be known in advance. Each wave shape can be computed from the shape and area of the symbol or can be presented visually by repeatedly scanning a symbol and applying the output of the magnetic transducer to a cathode-ray oscilloscope. The relative amplitudes of a number of points on the wave shape, corresponding to the positions of the delay line sampling points, when the wave shape is to be in its reference position, are used to determine the values of the voltage division ratios of the correlating voltage divider network. From the energy content of the wave shape, an energy weighting factor is computed in accordance with the theory on which Equation 1 is based, and an appropriate attenuator is designed to cooperate with the voltage divider network.

Figure 4:
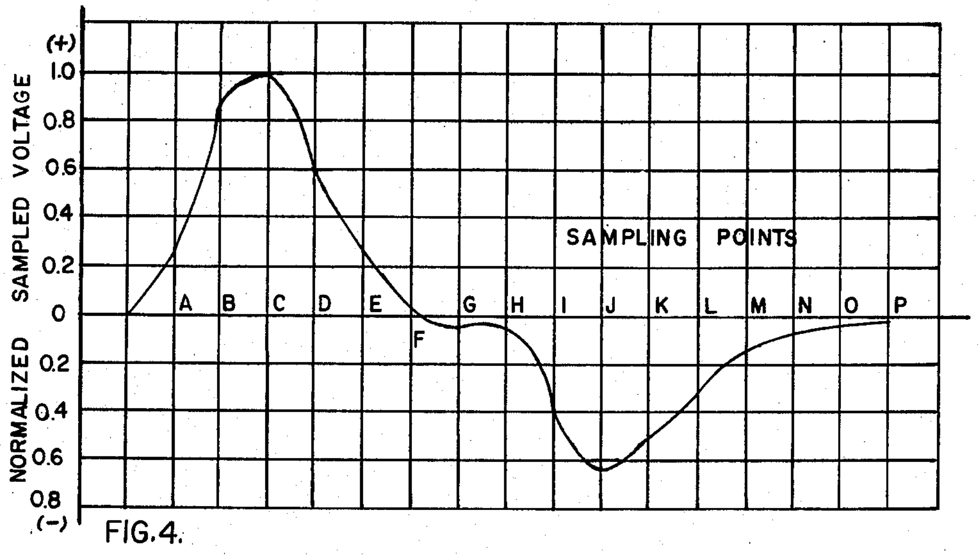
Figure 4 illustrates another wave shape shown to assist in explaining and understanding the invention.
Figure 5:
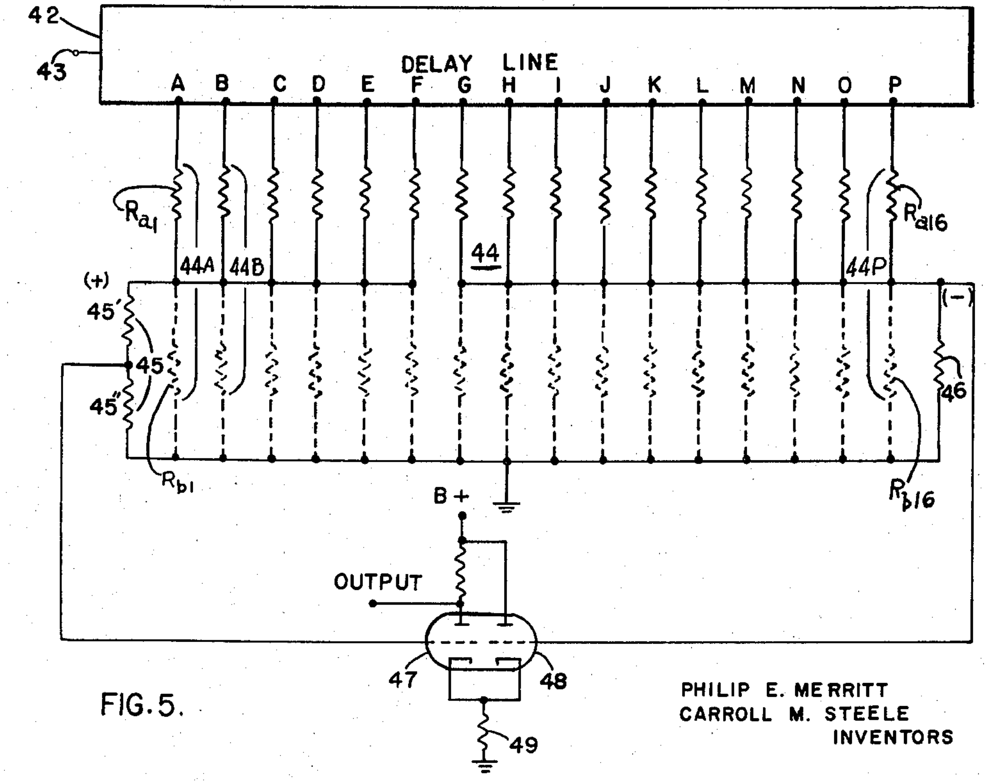
Figure 5 is a circuit diagram of a resistance network constituting a part of the first embodiment of the invention.

Figures 4 and 5 illustrate an actual wave shape to be identified and a resistance network or matrix employed to recognize that wave shape. In the foregoing theoretical illustration, the delay line was assumed to be lossless, or non-dissipative, so that the wave shape delivered at the delay line sampling points was identical to that derived by the magnetic transducer. However, a practical delay line will usually be dissipative and attenuate the wave traveling through it. The total amount of attenuation of a traveling wave in such a line increases with the distance traveled; consequently, the wave shape applied will be increasingly distorted as the sampling points selected are found farther from the input terminal of the line. The wave shape to be recognized in this instance, therefore, would not be the same as that produced at the magnetic transducer, but would be the wave shape actually delivered at the sampling points of the line. The wave shape illustrated in Fig. 4 is that received from the sixteen sampling points of dissipative delay line 42 of Fig. 5 when the numeral "7" is moved relative to a magnetic transducer, and the output thereof is applied to the input terminal 43 of delay line 42. The wave shape of Fig. 4 has both positive and negative portions and is normalized so that its maximum amplitude is ±1.0. The number of sampling points necessary to insure symbol recognition is determined by the number, nature, and style of the symbols to be recognized and by the highest frequency and duration of the corresponding wave shapes. In the present instance ten symbols, whose wave shapes will be given subsequently, were to be recognized and sixteen delay line sampling points were employed. The highest frequency present, W, in the wave shapes was 9000 cycles. The time for a wave to travel between successive sampling points was 44.1 microseconds, so that the duration, T, of the wave shape sampling interval was 661 microseconds. Consequently the minimum number of sampling points to completely define a wave shape was $2WT=12$. Sixteen sampling points were employed to give a factor of safety which would improve accuracy of recognition in the presence of considerable noise. However, this number of sampling points is not to be considered as a limitation on the invention.

A voltage divider 44 is connected between each delay line sampling point and ground. The voltage dividers are identified in Fig. 5 according to the sampling point to which they are connected. Thus, voltage divider 44A is connected to sampling point A and includes the two resistance portions $R_{a1}$ and $R_{b1}$. Similarly, voltage dividers 44B to 44P are connected to respective sampling points B to P and include respectively two resistance portions $R_{a2}$ to $R_{a16}$ and $R_{b2}$ to $R_{b16}$. The tapped points of all voltage dividers delivering positive voltages are connected together. Similarly, the tapped points of all voltage dividers delivering negative voltages are connected together.

The actual resistance values employed in the resistance matrix of Fig. 5 to recognize the wave shape of Fig. 4 and the steps by which they were derived are listed below in Table I. It should be noted that since resistors $R_{b1}$—$R_{b6}$ are in parallel they may be replaced by one resistor, designated as $R_b^+$. Similarly resistors $R_{b7}$—$R_{b16}$ may be replaced by one resistor designated as $R_b^-$. Resistors $R_{b1}$—$R_{b16}$ are illustrated by broken lines inasmuch as they are not physically incorporated in the circuit, but are shown only to illustrate design objectives.

In Table I the first column represents the original relative times at which the voltages delivered from the sixteen sampling points were derived. (These times correspond to the upper abscissa values in Figs. 2 and 3.) The second column shows the relative voltage $v$ of the wave shape at each time listed in the first column. It is this wave shape that is actually applied to the delay line. These values, $v$, of relative voltage include an arbitrary scale factor, since they were determined by making linear distance measurements on the face of a cathode-ray oscilloscope, to which had been applied this wave shape. Thus, while these values, $v$, are directly proportional to the actual voltages of the wave shape, they are not necessarily equal to the actual wave shape voltages. The third column gives the relative amplitude reduction $l$ experienced by a wave in delay line 42 between its input terminal 43 and the corresponding sampling point indicated in the fourth column. This relative amplitude reduction for line 42 is expressed by the equation $$l_i=\frac{0.51}{(i-1)(0.0327)+0.51} \tag{23}$$

where $i=1$ for sampling point A, 2 for sampling point B, etc. The column entitled "sampled relative voltage" is the attenuated wave shape voltage of the second column actually delivered at the corresponding sampling point and is given by $v\times l_i$. The normalized sampled voltage, $\omega_i$, is found by dividing each value of sampled relative voltage by the sampled relative voltage having maximum magnitude (5.02 for this example). The resistance matrix is determined from these values of normalized sampled voltage.

It is easily shown that if the tapped points of a number of voltage dividers are connected together, and if the impedances to ground, $R_0$, at each tapped point before the interconnection were identical, the voltage delivered at the common connection point is proportional to the sum of the individual voltages, $e_s$, at each tapped point before the interconnection; that is, $$V=\frac{1}{s}\sum_{1}^{s}e_s \tag{24}$$

where $s$ is the number of points connected together. It is to be noted, however, that the summation voltage, $v$, differs from the true sum of the voltages, $e_s$, by a factor inversely proportional to the number of points connected together. In the resistor network of Fig. 5 the value of $R_0$ is chosen to be 100,000 ohms. If the internal impedance of the delay line is low compared to $R_0$, it may be neglected in designing the voltage dividers of the resistor matrix. Thus, the design equations for the matrix,

*Table I*

| Wave Shape Time | Relative Voltage $v$ | Line Loss Factor $l_i$ | Sampling Point | Sampled Relative Voltage $v\times l_i$ | Normalized Sampled Voltage $\omega_i=\frac{v\times l_i}{(v\times l_i)_{max}}$ | $(1-\lvert\omega_i\rvert)$ | $R_{ai}$ |
|---|---|---|---|---|---|---|---|
| $t_{16}$ | +1.2 | 1.00 | A | 1.20 | .239 | .761 | 418K |
| $t_{15}$ | +4.7 | .94 | B | 4.42 | .880 | .120 | 114K |
| $t_{14}$ | +5.7 | .88 | C | 5.02 | 1.000 | 0 | 100K |
| $t_{13}$ | +3.5 | .84 | D | 2.94 | .586 | .414 | 177K |
| $t_{12}$ | +1.6 | .80 | E | 1.28 | .255 | .745 | 392K |
| $t_{11}$ | +0.3 | .76 | F | 0.23 | .046 | .954 | 2,175K |
| $t_{10}$ | −0.4 | .72 | G | −0.29 | −.058 | .942 | 1,724K |
| $t_9$ | −0.3 | .69 | H | −0.21 | −.042 | .958 | 2,381K |
| $t_8$ | −2.7 | .66 | I | −1.78 | −.355 | .645 | 282K |
| $t_7$ | −5.0 | .64 | J | −3.20 | −.637 | .363 | 157K |
| $t_6$ | −4.1 | .61 | K | −2.50 | −.498 | .502 | 201K |
| $t_5$ | −3.0 | .59 | L | −1.77 | −.353 | .647 | 283K |
| $t_4$ | −1.5 | .57 | M | −0.86 | −.171 | .829 | 585K |
| $t_3$ | −0.7 | .55 | N | −0.39 | −.078 | .922 | 1,282K |
| $t_2$ | −0.4 | .53 | O | −0.21 | −.042 | .958 | 2,381K |
| $t_1$ | −0.1 | .51 | P | −0.05 | −.010 | ≐1 | ≐∞ |
| | | | | | $R_b^+=33.4K$ | $R_\pi^+=16.7K$ | |
| | | | | | $R_b^-=14.8K$ | $R_\pi^-=14.8K$ | |

in this instance, did not account for the line internal impedance. Therefore, $$R_0=\frac{R_{ai}R_{bi}}{R_{ai}+R_{bi}}=100K \tag{25}$$

where K represents 1000 ohms.

The voltage division ratio is set equal to the magnitude of the normalized sampled voltage, $\omega_i$, $$\frac{R_{bi}}{R_{ai}+R_{bi}}=|\omega_i| \tag{26}$$

Solving Equation 26 for $R_{bi}$, substituting in Equation 25 and solving for $R_{ai}$, gives $$R_{ai}=\frac{100K}{|\omega_i|} \tag{27}$$

The upper resistors $R_{ai}$ of the voltage dividers of Fig. 5 were designed according to Equation 27 and are specified in the last column of Table I.

Solving Equation 26 for $R_{ai}$, substituting in Equation 25 and solving for $R_{bi}$, gives $$R_{bi}=\frac{100K}{1-|\omega_i|} \tag{28}$$

and therefore, the values of $R_{bi}$, the lower resistors of the voltage dividers of Fig. 5, may be designed by employing the column of Table I giving values of $(1-|\omega_i|)$ and Equation 28. However, it has been pointed out that each of the sets of parallel resistors may be replaced by one resistor. The conductance of each replacement resistor is obtained by adding the conductances of the resistances to be combined. Therefore, from Equation 28, $R_b^+$, the parallel combination of the first six lower resistors $R_{b1}$–$R_{b6}$ is given by $$\frac{1}{R_b^+}=\sum_1^6\frac{1-|\omega_i|}{100K} \tag{29}$$

and $R_b^-$, the parallel combination of the seventh to fifteenth lower resistors $R_{b7}$–$R_{b15}$ is given by $$\frac{1}{R_b^-}=\sum_7^{15}\frac{1-|\omega_i|}{100K} \tag{30}$$

The values of resistors $R_b^+$ and $R_b^-$ are given at the bottom of Table I. For this wave shape $R_{a16}$ was very large and could be considered an open circuit. Therefore voltage divider 44P was eliminated and $R_{b16}$ was not considered in Equation 30.

Equation 24 illustrates that the sum of the positive voltages from each tapped point of the first six voltage dividers is decreased by a factor of six from the true value, whereas the sum of the negative voltages from each tapped point of the seventh to fifteenth dividers is decreased by a factor of nine from its true value. Inasmuch as it is desirable that the positive and negative voltage outputs from the resistance matrix be similarly proportional to the respective positive and negative summation voltages, resistor $R_b^+$ is modified to also represent nine parallel resistors, six of which are $R_{b1}$–$R_{b6}$ and three of which are simulated. Referring to sampling point P in Table I, it is noted that if the sampled voltage is zero, the corresponding resistor $R_{ai}$ is $\infty$ and the corresponding $$(1-|\omega_i|)=1$$

the latter factor indicating a lower resistor $R_{bi}$ of 100K ohms. Thus, three zero voltage positive sampling points are simulated, which effectively add three 100K ohm resistors in parallel with resistors $R_{b1}$–$R_{b6}$, reducing $R_b^+$ to 16.7K ohms. With this value of $R_b^+$ the true sum of the positive tapped point voltages is also decreased by a factor of nine. Therefore, the value of the resistor actually replacing resistors $R_{b1}$–$R_{b6}$ is 16.7K ohms. This resistor is designated $R_\pi^+$ and is shown by the resistor 45 in Fig. 5. The resistor which replaces resistors $R_{b7}$ to $R_{b15}$ is designated $R_\pi^-$ and is shown by the resistor 46. Resistors $R_{ai}$ in the last column of Table I and $R_\pi^+$ and $R_\pi^-$ constitute the actual resistance matrix of the correlation network as it was built and operated to recognize the numeral "7."

The positive summation voltage is applied to the control grid of a first electron tube 47 through a voltage divider comprising the two portions 45' and 45'' of resistor 45. The negative summation voltage is applied to the control grid of a second electron tube 48. Tube 47 functions as a difference amplifier, producing an output signal proportional to the difference of the voltages of two signals applied respectively to its control grid and cathode. It is desired that the output voltage of tube 47 be proportional to the sum of the magnitudes of the aforementioned positive and negative summation voltages. However, the cathode of tube 47 receives the negative summation voltage from the cathode resistor 49 of tube 48, which is connected as a cathode follower. To compensate for the attenuation in the negative summation voltage induced by the cathode follower stage the positive summation voltage is correspondingly attenuated by voltage divider 45', 45''. (In the circuit employed, the cathode follower stage reduced the negative summation voltage to 0.91 of its original amplitude. Consequently the voltage division ratio of dividers 45', 45'' was set equal to 0.91. Resistor 45' was 1.5K ohms and 45'' was 15.2K ohms.) In the event that a single resistor 45 had not been substituted for $R_{b1}$–$R_{b6}$ this attenuation of the positive summation signal could have been similarly effected by an attenuator connected between the common connection point of resistors $R_{b1}$–$R_{b6}$ and the control grid of tube 47.

The signals applied to the respective control grid and cathode of tube 47 are, therefore, similarly proportional to the positive and negative summation voltages of the resistance matrix of Fig. 5. Consequently, since the two input voltages to difference amplifier 47 are opposite in polarity, the output voltage therefrom represents the sum of the magnitudes of the positive and negative summation voltages and, therefore, this output voltage is proportional to the sum of the magnitudes of all the individual voltages, $e_s$, available at each voltage divider tapped point of the resistance matrix before the interconnections. When the wave shape of Fig. 4 is in its reference position, as shown, the output voltage of tube 47 is proportional to the coefficient of auto-correlation given in Equation 11, but is uncorrected for the wave shape energy, since an attenuation proportional to the term in the denominator has not yet been applied at this point.

Also connected to each sampling point of delay line 42 of Fig. 5 and in parallel with a voltage divider of the resistance matrix shown is a voltage divider of each resistance matrix of each correlation network designed to recognize a different wave shape. In this embodiment of this invention nine other correlation networks are provided, each adapted to recognize a different one of the symbols 0–9.

The relative voltages of the original undistorted wave shapes for each symbol and the resistance values for the resistance matrix of the corresponding correlation network are given in Table II.

In Table II each value of $R_{ai}$ is derived from the corresponding value of relative voltage $v$ in the same manner that the values of $R_{ai}$ in Table I were derived. Resistors $R_b^+$ and $R_b^-$ are obtained by computation from the totality of $v$'s for each symbol as described previously. Where no values of $R_{ai}$ are indicated in the table, the theoretical value was infinite, and no connection was made between the corresponding sampling point and correlation network for that symbol. The actual resistors $R_\pi^+$ and $R_\pi^-$ between the respective positive and negative connection points and ground are obtained, as before, from the values of $R_b^+$ and $R_b^-$, in order that the positive and negative voltage outputs from the resistance matrices are similarly proportional to the respective positive and negative summation voltages.

*Table II*

| Wave Shape Time and Sampling Point | Symbol | | | | | | | | | |
|---|---|---|---|---|---|---|---|---|---|---|
| | 0 | | 1 | | 2 | | 3 | | 4 | |
| | v | $R_{ai}$ | v | $R_{ai}$ | v | $R_{ai}$ | v | $R_{ai}$ | v | $R_{ai}$ |
| $t_{16}$, A | 0 | ------ | 0 | ------ | 0.4 | ------ | 0.3 | 2,632K | 1.0 | 833K |
| $t_{15}$, B | 4.5 | 185K | 4.5 | 212K | 3.0 | 147K | 5.5 | 152K | 4.0 | 222K |
| $t_{14}$, C | 8.9 | 100K | 10.2 | 100K | 4.6 | 100K | 8.9 | 100K | 9.5 | 100K |
| $t_{13}$, D | 1.0 | 934K | 1.1 | 980K | 1.6 | 302K | 2.7 | 345K | 1.6 | 625K |
| $t_{12}$, E | −4.1 | 238K | −7.0 | 160K | −0.7 | 725K | −2.0 | 490K | −5.5 | 190K |
| $t_{11}$, F | −2.2 | 469K | −3.7 | 319K | −0.5 | 1,064K | −2.1 | 490K | −1.1 | 1,000K |
| $t_{10}$, G | −1.7 | 641K | −2.5 | 500K | −0.6 | 943K | 2.7 | 403K | 2.7 | 431K |
| $t_9$, H | −0.4 | 2,631K | −1.2 | 1,087K | 0 | ------ | 1.7 | 671K | 4.0 | 303K |
| $t_8$, I | 0 | ------ | −2.5 | 2,703K | 0.3 | 2,041K | −1.2 | 990K | 0 | |
| $t_7$, J | 0.5 | 2,439K | −0.5 | 2,778K | 0.3 | 2,128K | −2.0 | 613K | −3.5 | 373K |
| $t_6$, K | 4.0 | 320K | 0 | ------ | −2.0 | 332K | −2.5 | 513K | −4.5 | 304K |
| $t_5$, L | 5.0 | 265K | 0 | ------ | −3.8 | 181K | −2.1 | 633K | −3.7 | 383K |
| $t_4$, M | −4.0 | 343K | 0 | ------ | −2.3 | 309K | −1.5 | 909K | −1.8 | 813K |
| $t_3$, N | −6.5 | 218K | 0 | ------ | −1.1 | 662K | −0.7 | 2,000K | −1.0 | 1,515K |
| $t_2$, O | −2.6 | 568K | 0 | ------ | −0.7 | 1,099K | −0.4 | 3,704K | −0.6 | 2,632K |
| $t_1$, P | −1.8 | 854K | 0 | ------ | −0.4 | 2,041K | −0.1 | ------ | −0.3 | 5,556K |
| $R_{b}^{+}$ | 27.6K | | 70.1K | | 34.8K | | 49.7K | | 30.0K | |
| $R_{b}^{-}$ | 16.3K | | 21.3K | | 13.9K | | 10.6K | | 13.6K | |
| $R_{\pi}^{+}$ | 17.8K | | 22.8K | | 14.5K | | 11.1K | | 15.8K | |
| $R_{\pi}^{-}$ | 16.3K | | 21.3K | | 13.9K | | 10.6K | | 13.6K | |

| Wave Shape Time and Sampling Point | Symbol | | | | | | | | | |
|---|---|---|---|---|---|---|---|---|---|---|
| | 5 | | 6 | | 7 | | 8 | | 9 | |
| | v | $R_{ai}$ | v | $R_{ai}$ | v | $R_{ai}$ | v | $R_{ai}$ | v | $R_{ai}$ |
| $t_{16}$, A | 0.2 | ------ | 0 | ------ | 1.2 | 418K | 0 | 164K | 0 | |
| $t_{15}$, B | 3.9 | 132K | 2.2 | 179K | 4.7 | 114K | 3.6 | 100K | 5.7 | 168K |
| $t_{14}$, C | 5.5 | 100K | 4.2 | 100K | 5.7 | 100K | 6.3 | 441K | 10.3 | 100K |
| $t_{13}$, D | 1.5 | 385K | 1.2 | 366K | 3.5 | 177K | 1.5 | 461K | 2.5 | 431K |
| $t_{12}$, E | −0.7 | 862K | −0.4 | 1,163K | 1.6 | 392K | −1.5 | 559K | −3.2 | 353K |
| $t_{11}$, F | 0 | ------ | 0 | ------ | 0.3 | 2,174K | −1.3 | 547K | −2.0 | 595K |
| $t_{10}$, G | −0.6 | 1,124K | 0 | ------ | −0.4 | 1,724K | −1.4 | 2,632K | −1.9 | 662K |
| $t_9$, H | −0.8 | 877K | 0.4 | 1,316K | −0.3 | 2,381K | −0.3 | 833K | −1.1 | 1,190K |
| $t_8$, I | 2.7 | 272K | 0.4 | 1,429K | −2.7 | 282K | 1.0 | 310K | −0.5 | 2,778K |
| $t_7$, J | 2.8 | 270K | 0.7 | 820K | −5.0 | 157K | 2.8 | 284K | 0.2 | |
| $t_6$, K | −3.1 | 256K | 3.3 | 184K | −4.1 | 201K | 3.2 | 469K | 1.7 | 870K |
| $t_5$, L | −5.0 | 164K | 2.0 | 313K | −3.0 | 283K | −2.0 | 170K | 1.2 | 1,282K |
| $t_4$, M | −2.7 | 314K | −4.7 | 138K | −1.5 | 585K | −5.7 | 314K | −3.8 | 417K |
| $t_3$, N | −1.5 | 585K | −4.5 | 149K | −0.7 | 1,282K | −3.2 | ------ | −4.2 | 392K |
| $t_2$, O | −0.6 | 1,515K | −1.8 | 389K | −0.4 | 2,381K | −1.5 | 694K | −1.5 | 1,136K |
| $t_1$, P | −0.3 | 3,226K | −1.2 | 606K | −0.1 | ------ | −0.8 | 1,351K | −1.1 | 1,613K |
| $R_{b}^{+}$ | 44.6K | | 19.8K | | 33.4K | | 27.9K | | 33.5K | |
| $R_{b}^{-}$ | 14.1K | | 32.3K | | 14.8K | | 14.2K | | 13.1K | |
| $R_{\pi}^{+}$ | 16.0K | | 14.8K | | 16.7K | | 15.7K | | 14.5K | |
| $R_{\pi}^{-}$ | 14.1K | | 16.4K | | 14.8K | | 14.2K | | 13.1K | |

COMPLETE SYMBOL READER

Figure 6:
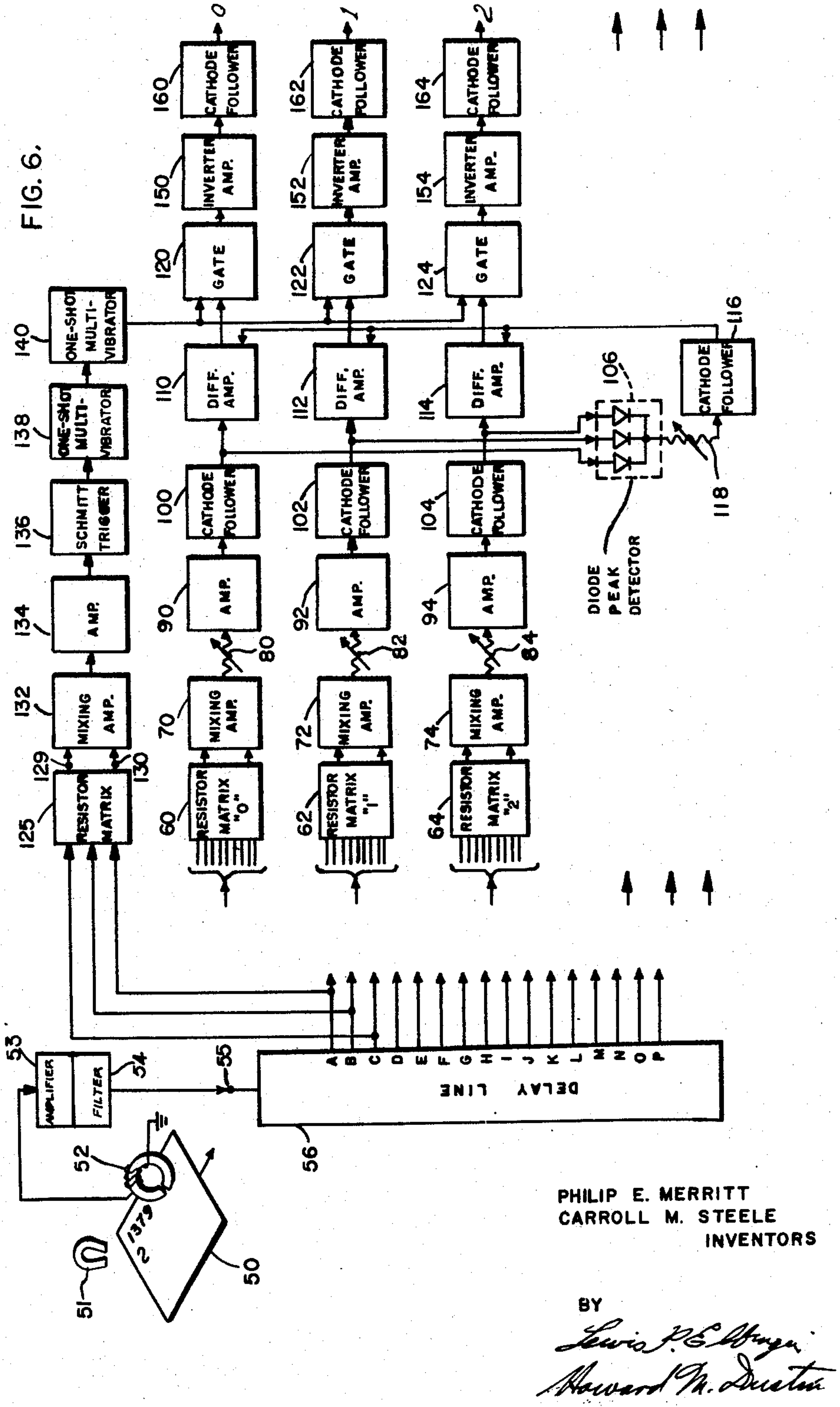
Figure 6 is a schematic diagram of a first embodiment of the invention.

Figure 6 is a complete embodiment of this invention and includes the correlation networks heretofore described, electronic circuits for interpreting the output signals of the correlation networks, and associated input equipment. This embodiment is adapted to recognize only the numbers 0 to 9. However, this is not to be understood to be a limitation upon the invention, since, employing the principles of this embodiment, not only may numbers be recognized, but also letters, and other symbols, such as +, —, punctuation marks, or other geometric configurations. A correlation network is provided in this figure for each symbol to be recognized. In Fig. 6, a sheet of paper 50 is shown, which has the symbols thereon printed in an ink capable of magnetization. Sheet 50 is moved relative to a permanent magnet 51 and then passes a magnetic transducer 52, which may also be termed a magnetic reading head. A magnet, such as a permanent magnet 51, magnetizes the symbols to be recognized prior to their "reading" by head 52. Head 52 is responsive to the passing magnetized areas and delivers an output signal corresponding to these areas. The output signal of head 52 is a function of time, the magnitude thereof at any instant being determined by the properties of the area passing the head at that time. The output signal of reading head 52 is applied to an amplifier 53, the output signal of which passes through a low pass filter 54 and is applied to an input terminal 55 of a delay line 56, which is provided with the usual reflection-free termination. Delay line 56 is similar to line 43 of Fig. 5 and serves the function of enabling various portions of each wave shape applied thereto to be sampled. A plurality of sampling points A–P are provided along delay line 56. The number of sampling points utilized is here determined by the maximum frequency passed by filter 54 and by the time for the wave to travel from the first to the last sampling point, as previously described. In this embodiment sixteen sampling points are employed for the reasons indicated in the description of Fig. 5. Although filter 54 has been described as limiting the highest wave shape frequency, the filtering action for limiting the number of sampling points to define the wave shape may be realized in head 52, amplifier 53, or line 56, or any combination thereof. Each sampling point is connected in parallel to a voltage divider of each of the resistance matrices (60, 62, 64, etc.). Although ten resistance matrices are provided to separately identify the symbols 0 to 9, only three matrices and their associated electronic apparatus are shown in Fig. 6 for the purpose of simplicity. Each one of resistance matrices (60, 62, 64, etc.) is designed in accordance with the preceding analysis, and the particular resistance values employed are those of Table II. Thus, resistance matrix 60 is designed with a correlation function determined by the wave shape derived from delay line 56 when the number "0" is being scanned by head 52, resistance matrix 62 is designed with a correlation function determined by the wave shape derived from delay line 56 when the number "1" is being scanned by head 52, and the design of each of the remainder of this group of resistance matrices is similarly conditioned by the respective wave shapes derived from delay line 56 when the respective numbers "2" to "9" are being scanned by head 52.

The positive and negative summation voltages from each of the resistance matrices (60, 62, 64, etc.) are applied to a respective one of the mixing amplifiers (70, 72, 74, etc.). The term "mixing amplifier" is employed here to designate the circuit arrangement including electron tubes 47 and 48 of Fig. 5, which effectively mixes a pair of input signals and produces a difference voltage output. The output signal from each mixing amplifier is, therefore, proportional to the summation of the magnitudes of all voltages delivered at the unloaded tapped points of the voltage dividers of the corresponding resistance matrix. The output signal from each of the mixing amplifiers (70, 72, 74, etc.) is applied to a respective one of the attenuators (80, 82, 84, etc.). It is the function of the attenuators (80, 82, 84, etc.) to "weight" the summation voltage delivered by each mixing amplifier according to the relative energy stored in the normalized wave shape to be identified. The amount of weighting to be accomplished in these attenuators is determined in accordance with the theory on which Equation 1 was based. This attenuation is determined by obtaining a first term equal to the square root of the sum of the squares of the normalized sampled voltages, $\omega_1$, for each wave shape (a set of these values for the number "7" was shown in Table I). By attenuating the output signal of each mixing amplifier in accordance with a factor inversely proportional to such a first term for the wave shape conditioning the design of the corresponding resistance network, a compelte correlation network for each wave shape may be obtained. However, a correction factor must be here applied because of the unequal reduction in the true sum of the voltages delivered by each resistance matrix depending on the number of points connected together, as was shown in Equation 24. Therefore, the complete effect of each of the attenuators (80, 82, 84, etc.) is to multiply the amplitude of each of the respective signals passing therethrough by a factor which is directly proportional to the term "$s$" of Equation 24 associated with the corresponding resistance matrix, and which is inversely proportional to the abovementioned first term (i.e., the energy content of the normalized wave shape to be identified). With such design, in the presence of an impressed wave corresponding in shape to the design conditioning wave shape, the output signal of the corresponding attenuator is greater than that of any other.

The apparatus to the right of each attenuator in Fig. 6 is that necessary to interpret the output signals of the complete correlation networks and in response thereto to deliver a signal on only one of a number of leads corresponding to the symbol recognized. The output signal of each of the attenuators (80, 82, 84, etc.) is applied to a respective one of the amplifiers (90, 92, 94, etc.). The output signal from each of the amplifiers (90, 92, 94, etc.) is applied in turn to a respective one of the cathode followers (100, 102, 104, etc.). The output signal of each of the cathode followers (100, 102, 104, etc.) is applied in parallel to a respective one of the diodes of a diode peak detector 106 and to one input terminal of a respective one of the difference amplifiers (110, 112, 114, etc.). The diodes of peak detector 106 are so polarized that only the greatest signal applied thereto is delivered at the detector output terminal. The output terminal of peak detector 106 is connected to an attenuator 118, which in turn is connected to a cathode follower 116. The function of attenuator 118 will be described below. The output signal of cathode follower 116 is applied in parallel to the other input terminal of each of the difference amplifiers (110, 112, 114, etc.). Each of the difference amplifiers (110, 112, 114, etc.) may be of the type shown in Fig. 5. This difference amplifier used here is one which provides a positive output signal with respect to a reference voltage only if the signal applied to one of its input terminals exceeds the signal applied to the other of its input terminals; otherwise the output signal is negative. In this instance, each of the difference amplifiers (110, 112, 114, etc.) is so connected that only when the input signal received from its associated cathode follower (100, 102, 104, etc.) exceeds the input signal received from cathode follower 116 does it deliver a positive output signal. Accordingly, if attenuator 118 is designed to attenuate the signal applied thereto by only a small amount, the only one of the difference amplifiers (110, 112, 114, etc.) which provides a positive output signal is the one to which the maximum amplitude signal from the cathode followers (100, 102, 104, etc.) is applied. Thus, attenuator 118 is adjusted to reduce the amplitude of the peak signal passed by peak detector 106 to a value slightly below that peak level, in order that it may provide a signal to the difference amplifiers (110, 112, 114, etc.) having an amplitude between that of the largest output signal from the cathode followers (100, 102, 104, etc.) and the next lower signal.

Figures 7, 8, 9:
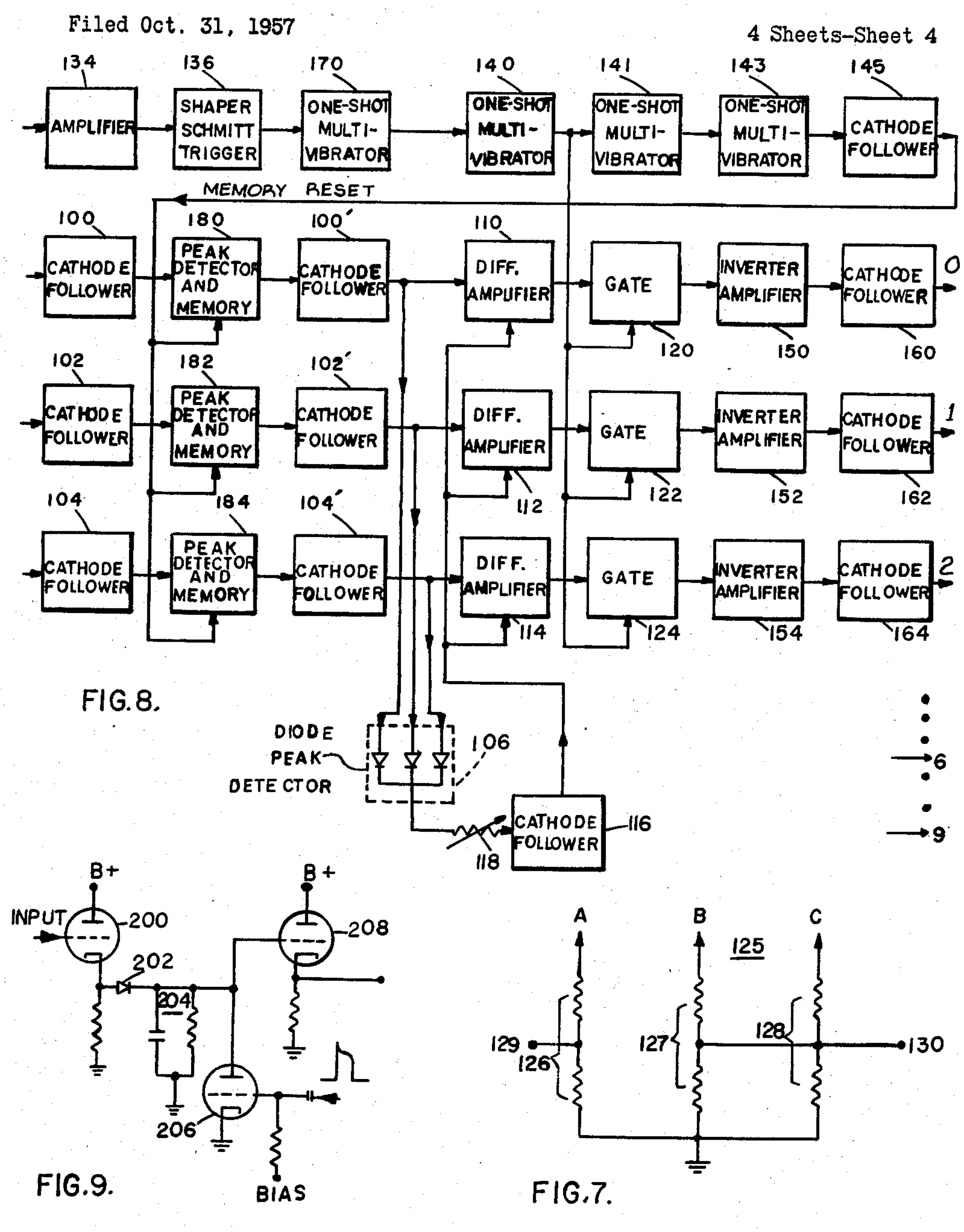
Figure 7 is a circuit diagram illustrating in detail the resistor matrix 125 of Fig. 6.
Figure 8 illustrates a modification of the diagram shown in Fig. 6.
Figure 9 is a circuit diagram of a peak-detector-and-memory circuit which is suitable for employment in the embodiment of Fig. 8.

The output signal of each of the difference amplifiers (110, 112, 114, etc.) is applied to a respective one of the gates (120, 122, 124, etc.). The purpose of these gates will become apparent from the following explanation. It was originally pointed out that Equations 16, 19, and 22 illustrated that the auto-correlation voltage developed when a wave is in its reference position is greater than any other correlation voltage developed in the apparatus for that wave. If, therefore, no more than one wave shape, or part thereof, for which an auto-correlation network is provided is applied to delay line 56, a simple detecting system might be employed. The output signal of each correlation network taken following the attenuators (80, 82, 84, etc.) could be applied to a peak voltage detector, which would retain the peak value of voltage delivered by each correlation network as a symbol is scanned. A subsequent comparison of these peak voltages would indicate the identity of the symbol scanned. Such a system is within the spirit of this invention, and is shown in Fig. 8. However, the embodiment of Fig. 6 is intended to identify symbols which are printed sufficiently close together so that portions of the wave shapes derived from scanning two successive symbols may be in delay line 56 simultaneously. In such event the correlation described in connection with Equations 16, 19, and 22 is not applicable and correlation may only be achieved when a wave shape is present and properly located at its reference position in the delay line. Thus, the wave shape should be sampled only when it is in its reference position. If this is not done, it is possible to obtain erroneous indications where the symbols are spaced closely together as described above. The purpose of gates (120, 122, 124, etc.) is to permit sampling the output signals of the difference amplifiers only when the wave shape is in this reference position. This is accomplished by applying a sampling trigger signal to each of the gates (120, 122, 124, etc.) and thereby opening them when a wave is in the reference position.

The sampling trigger signal is derived as follows: A resistance matrix 125 comprising voltage dividers 126, 127, and 128 (Fig. 7) is coupled to the first three sampling points of delay line 56. Voltage dividers 126, 127, and 128 are connected to respective sampling points A, B, and C. The voltage division ratios of all of dividers 126, 127, and 128 are alike and may be identified numerically as "y." The tapped point of divider 126 is conected to a terminal 129 and the tapped points of dividers 127 and 128 are connected together and to a terminal 130. The resistors of matrix 125 may be designed in a manner similar to that by which the resistors of Table I were designed. Terminal 129 is connected to the control grid of the cathode follower and terminal 130 to the control grid of the difference amplifier of a mixing amplifier 132 (Fig. 6), which is similar to the combination of tubes 47 and 48 of Fig. 5. Thus, the output of mixing amplifier 132 is given by $$V=y[V_A-(V_B+V_C)] \quad (31)$$

where $V_A$, $V_B$, $V_C$ represent the actual voltages occurring at respective sampling points A, B, C. The output signal of mixing amplifier 132 is applied to an amplifier 134, which amplifies and inverts the signal applied thereto.

Referring now the wave shape of Fig. 4 to the circuit of Fig. 6 it may be noted that as the wave shape enters delay line 56 sampling point A is first to deliver an output voltage, which is positive. Thus, the first portion of the leading edge of the wave shape provides an increasing negative voltage from amplifier 134. As the wave shape progresses further along line 56, the output signals from sampling points B and C, which are added together and subtracted in the mixing amplifier from the signal from point A, became increasingly significant. Eventually the signal at terminal 130 becomes equal to that at terminal 129 and the output signal from mixing amplifier 132 goes to zero and becomes negative. Correspondingly, the output signal from amplifier 134 goes to zero and becomes positive. This change in output signal polarity of amplifier 134, occasioned by the advance of the wave shape leading edge along line 56, may be employed to indicate the arrival of the wave shape in the delay line and, further, to provide a signal for opening the gates (120, 122, 124, etc.). This is a satisfactory method of timing for all symbols since the signals derived by scanning magnetic symbols printed on unmagnetized paper increase positively for the first portion of all symbols.

The output signal of amplifier 134 is applied to a Schmitt trigger circuit 136. The Schmitt trigger circuit is a well-known type of trigger circuit which is driven from a first state to a second state, where it remains so long as the input voltage exceeds a predetermined level. Upon reduction of the input voltage to a particular lower level, the trigger circuit reutrns to its first state. (An example of such a circuit is shown in the book by L. W. Von Tersch and A. W. Swago, "Recurrent Electrical Transients," p. 277, Prentice-Hall, Inc., New York, 1953.) Thus, circuit 136 is driven to its second state immediately after the output signal of amplifier 134 goes to zero and becomes positive. The output signal of circuit 136 is applied to a first one-shot multivibrator 138, which in turn drives a second one-shot multivibrator 140. Each of these one-shot multivibrators delivers an output signal at a predetermined time after the application of an input signal thereto. Multivibrator 138 determines the delay before an output pulse is provided by multivibrator 140, following the time when the output signal of amplifier 134 reaches zero and becomes positive. This delay is that necessary for the wave shape to move to its reference position in the delay line. Multivibrator 140 determines the duration of the gating pulse. Each wave shape will thus be sampled at a definite time after its arrival at line input terminal 55, as provided by the above-described network.

The output pulse of multivibrator 140 is therefore applied to open the gates (120, 122, 124, etc.) at the proper sampling time. Each of gates (120, 122, 124, etc.), is an amplifier type of gate, whose output signal is the amplified inverse of its gated input signal. Only when the input signal and the gating pulse each exceed a reference or threshold voltage does the gate conduct. Such circuits are shown in a book by Engineering Research Associates, entitled, "High Speed Computing Devices," section 4-3-3, McGraw-Hill Book Co., Inc., New York, 1950. Inasmuch as only one of the difference amplifiers (110, 112, 114, etc.) has a positive output signal at the related sampling time, only one of the gates (120, 122, 124, etc.) delivers an output signal, which will be negative. Each of the gates (120, 122, 124, etc.) is connected to a respective one of the inverter amplifiers (150, 152, 154, etc.), each of which inverts a signal applied thereto. Each of the inverter amplifiers (150, 152, 154, etc.) is connected to a respective one of the cathode followers (160, 162, 164, etc.). Only one of these cathode followers will deliver an output signal which is positive, at the selected sampling time, and it is the output lead of the cathode follower on which this positive signal occurs that is indicative of the symbol which has been scanned.

What has heretofore been described is an embodiment of the invention wherein one of a number of different output lines is energized to identify electrically the symbol which has just passed under the magnetic reading head. Such an output may be employed directly to operate data-handling machinery or may be converted into a desired code and then utilized.

MODIFIED EMBODIMENT

As has been indicated previously, where the symbols are printed sufficiently far apart so that no more than one wave shape, or part thereof, is present in delay line 56 at any time, the auto-correlation voltage developed at time $\tau$ is greater than any other correlation voltage developed in the apparatus for that symbol as the wave shape travels through the delay line. Therefore, it is not necessary in apparatus employed with this type of printing to sample the waveform and gate the apparatus at time $\tau$. Figure 8 illustrates a partial modification of Fig. 6 which may be employed under these conditions. Similar functioning apparatus is provided with the same reference numerals as in Fig. 6. As was previously described, when the output signal of amplifier 134 passes through zero and increases positively, the Schmitt trigger circuit 136 changes its state of operation. The output signal of circuit 136 actuates a chain of one-shot multivibrators (170, 140, 141, 143). Multivibrator 170 determines the delay before an output gating pulse is provided by multivibrator 140, following the time when the output signal of amplifier 134 reaches zero and becomes positive. Multivibrator 140 determines the duration of the gating pulse. Multivibrator 141 determines the time following delivery of the gating pulse when a memory reset pulse is initiated by multivibrator 143. Multivibrator 143 determines the duration of the memory reset pulse. The output pulse of multivibrator 143 is applied to a cathode follower 145, which in turn delivers a memory reset pulse to all of the peak-detector-and-memory circuits (180, 182, 184, etc.).

The cathode followers (100, 102, 104, etc.) of Fig. 8 deliver output signals as described previously and apply these signals to one of the respective peak-detector-and-memory circuits (180, 182, 184, etc.). One of these circuits is shown in detail in Fig. 9. The function of each peak-detector-and-memory circuit is to store the peak amplitude of the voltage applied thereto as the wave shape passes along line 56. Therefore, one of the peak-detector-and-memory circuits (180, 182, 184, etc.), will store a voltage proportional to the auto-correlation voltage developed at time $\tau$, and that voltage will be greater than the voltage stored in any other peak-detector-and-memory circuit for that wave shape. The output signal of each peak-detector-and-memory circuit (180, 182, 184, etc.) is applied to one of a second set of cathode followers (100′, 102′, 104′, etc.), and the signals of each of these in turn is applied in parallel to one diode of diode peak detector 106 and one input terminal of one of the difference amplifiers (110, 112, 114, etc.). As previously described, only one of these difference amplifiers will produce a positive output signal with respect to a reference voltage. The output signal of each of the difference amplifiers (110, 112, 114, etc.), is applied to a respective one of the gates (120, 122, 124, etc.). The only one of the gates (120, 122, 124, etc.) which delivers an output signal, which is negative, is that to which a positive input signal is applied by the corresponding one of the difference amplifiers (110, 112, 114, etc.). Each of the gates (120, 122, 124, etc.) is connected to a respective one of the inverter amplifiers (150, 152, 154, etc.). Each of the inverter amplifiers (150, 152, 154, etc.) is connected to a respective one of the cathode followers (160, 162, 164, etc.). Only one of these cathode followers will deliver an output signal, which is positive, when the gates (120, 122, 124, etc.) are opened, and it is the output lead of the cathode follower on which this positive signal occurs that is indicative of the symbol which has been scanned.

Multivibrator 170 is adjusted to delay the gating pulse delivered by multivibrator 140 until a time when the wave shape has reached and passed its reference position in the delay line. At this time one of the peak-detector-and-memory circuits (180, 182, 184, etc.) will store a voltage proportional to the peak auto-correlation voltage, which is developed at time $\tau$, and it is the corresponding one of the cathode followers (160, 162, 164, etc.) which delivers an output signal. Multivibrator 141 is adjusted to delay the memory reset pulse for a predetermined interval after the occurrence of the gating pulse. This reset pulse may occur approximately at the time the wave shape leaves the delay line, or even after a portion of the next wave shape has entered the delay line.

In a modification of the circuit of Fig. 8, the memory reset pulse is produced first after arrival of the wave shape leading edge in the delay line and clears the peak-detector-and-memory circuits before the wave shape reaches its reference position. The gating pulse is produced, in turn, after the wave shape has reached and passed its reference position. Thus, the circuit of Fig. 8 may also be used when the symbols are printed close to each other provided, however, only one wave shape is present in the delay line during the interval between the occurrence of a reset pulse and the next gating pulse.

The peak-detector-and-memory circuit shown in Fig. 9 stores a voltage proportional to the greatest amplitude input signal applied thereto until discharged by the application of a discharging signal. The circuit comprises a cathode follower 200, the output signal of which is applied through a diode 202 to a resistor-capacitor storage network 204. Network 204 stores the largest positive signal applied thereto until it is discharged. An amplifier 206, which is normally cut off by a large bias voltage applied to its control grid, has its plate connected to network 204. Amplifier 206 serves to discharge network 204 upon the application of a large positive signal to its control grid. This positive signal is derived from cathode follower 145. The signal stored by network 204 is connected to the control grid of a cathode follower 208, which corresponds to one of the cathode followers (100′, 102′, 104′, etc.) of Fig. 8. The output terminal of cathode follower 208 provides a signal suitable for use in succeeding circuits.

The foregoing embodiments are only exemplary of the way in which this invention may be mechanized. For example, it is not necessary that the wave shapes being recognized be derived by "reading" magnetized symbols. The wave shapes may be originated from other sources, such as by optically scanning geometrical patterns. Furthermore, it is not necessary that the correlation coefficient signals be weighted according to the relative energy of the corresponding normalized wave shape in separate attenuators, such as attenuators 80, 82 and 84. This weighting may be incorporated in the individual resistance matrices, so that the complete function of correlation takes place therein. Thus, each value of normalized sampled voltage, $\omega_1$, of Table I may be divided by the square root of the sum of the squares of these values of $\omega_1$ for that symbol before computing the resistances of the corresponding matrix. Such a design is shown in Table III and is consistent with Equation 7. The values of relative voltage, $v$, of the wave shape derived from a symbol "7" and the resistors of the corresponding correlation network are given in Table III. In the circuit in which this network was employed, eighteen sampling points were used on the delay line.

*Table III*

| Sampling Point | Relative Voltage $v$ | $R_{ai}$ |
|---|---|---|
| A | .121 | 413K |
| B | .377 | 133K |
| C | .299 | 169K |
| D | .087 | 584K |
| E | .299 | 171K |
| F | .299 | 172K |
| G | −.035 | −1,475K |
| H | −.519 | −100K |
| I | −.390 | −134K |
| J | −.156 | −337K |
| K | .035 | 1,515K |
| L | .104 | 510K |
| M | .048 | 1,110K |
| N | −.182 | −294K |
| O | −.242 | −222K |
| P | −.117 | −463K |
| Q | −.035 | −1,563K |
| R | −.013 | −1,167K |
| | $R_b^+$=352K | |
| | $R_b^-$=284K | |

The negative signs indicate a negative voltage was to be sampled at these delay line points.

There has therefore been described and shown herein a novel, useful, and accurate system for recognizing or automatically reading symbols printed in human language and for providing an electrical output indicative of the symbol read.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for recognizing each of a plurality of different signals, each representing a different functional relationship between a first and a second varying quantity, apparatus comprising; a plurality of transmission channels; distributing means having an input terminal for receiving any one of said different signals and having a plurality of output terminals for delivering the same to all of said transmission channels; each of said channels having data stored therein representing different functional relationships between a third and fourth varying quantity, said channel being adapted to modify the signal transmitted therethrough in accordance with the data stored therein; each of said channels further including means for multiplying the amplitude of the signal passing through said channel by a factor inversely proportional to the square root of the sum of the squares of the values of data stored therein; and means for sensing the signals delivered by all of said transmission channels to determine which one of said delivered signals has the greatest amplitude and for producing a signal identifying the one of said channels which delivers said greatest amplitude signal.

2. In a system for recognizing each of a plurality of different signals, each representing a different functional relationship between a first and a second varying quantity, apparatus comprising; a plurality of transmission channels equal in number to the number of said different signals; distributing means having an input terminal for receiving any one of said different signals and having a plurality of output terminals for delivering the same to all of said transmission channels; each of said channels having data stored therein representing different functional relationships between a third and a fourth varying quantity, said channel being adapted to modify the signal transmitted therethrough in accordance with the data stored therein; each of said channels further including means for multiplying the amplitude of the signal passing through said channel by a factor inversely proportional to the square root of the sum of the squares of the values of data stored therein; means for sensing the signals delivered by all of said transmission channels to determine which one of said delivered signals has the greatest amplitude and for producing a signal identifying the one of said channels which delivers said greatest amplitude signal.

3. In a system for recognizing each of a plurality of different signals, each representing a different functional relationship between a first and a second varying quantity, apparatus comprising: a plurality of transmission channels equal in number to the number of said different signals; distributing means having an input terminal for receiving any one of said different signals and having a plurality of output terminals for delivering the same to all said transmission channels, each of said channels including; signal modifying means, each having data stored therein representing different functional relationships between a third and a fourth varying quantity, said modifying means being responsive to the signals delivered from said distributing means for providing output signals each having an amplitude which is dependent on the relationship between a respective one of said delivered signals and the data stored in the associated modifying means; means comprising a part of each transmission channel for multiplying the amplitude of the signals of said associated modifying means by a factor inversely proportional to the square root of the sum of the squares of the values of the data representing said third quantity stored in said modifying means; means for sensing the signals delivered by all of said transmission means to determine which one of said delivered signals has the greatest amplitude; and means coupled to said sensing means and controlled thereby for producing a signal identifying the one of said channels which produces said greatest amplitude signal.

4. In a system for recognizing each of a plurality of different wave shapes, apparatus comprising; a plurality of transmission channels equal in number to the number of said different wave shapes; sampling means having an input terminal for receiving any one of said wave shapes and in response thereto for delivering a plurality of discrete signal samples of said wave shape to all of said transmission channels; each of said channels having a plurality of data elements stored therein, each of said data elements representing a value of a first quantity and the plurality of data elements stored in each of said channels defining different functional relationships between said first quantity and a second varying quantity; each of the plurality of data elements of each of said channels being adapted to modify a respective one of the signal samples delivered to the associated channel; means in each of said channels for combining all of said modified signals produced therein and for delivering a corresponding combination signal; means in each of said transmission channels for multiplying the amplitude of the signals passing through said channel by a factor inversely proportional to the square root of the sum of the squares of the values represented by the data elements stored therein; and means for sensing the signals delivered by all of said transmission channels to determine which one of said delivered signals has the greatest amplitude and for producing a signal identifying the one of said channels which delivers said greatest amplitude signal.

5. In a system for recognizing each of a plurality of different wave shapes, each of said wave shapes representing a different functional relationship between an electrical quantity and time, apparatus comprising; a plurality of transmission channels equal in number to the number of said different wave shapes; sampling means having an input terminal for receiving any one of said wave shapes and in response thereto for delivering a plurality of discrete signal samples of said wave shape to all of said transmission channels; each of said channels having a plurality of data elements stored therein, each of said data elements representing a value of a second quantity and the plurality of data elements stored in each of said channels defining different functional relationships between said second quantity and a third varying quantity, each functional relationship defined by the plurality of data elements stored in each channel being similar to a respective one of the functional relationships represented by said wave shapes; each of the plurality of data elements of each of said channels being adapted to modify a respective one of the signal samples delivered to the associated channel; means in each of said channels for combining all of said modified signals produced therein and for delivering a corresponding combination signal; means in each of said transmission channels for multiplying the amplitude of the signals passing through said channel by a factor inversely proportional to the square root of the sum of the squares of the values represented by the data elements stored therein; and means for sensing the signals delivered by all of said transmission channels to determine which one of said delivered signals has the greatest amplitude and for producing a signal identifying the one of said channels which delivers said greatest amplitude signal.

6. In a system for recognizing each of a plurality of different wave shapes, apparatus comprising; a plurality of transmission channels equal in number to the number of said different wave shapes, each of said channels corresponding to one of said wave shapes; sampling means having an input terminal for receiving any one of said wave shapes and in response thereto for delivering a plurality of discrete signal samples of said wave shape to all of said transmisison channels; each of said channels having a plurality of multiplying elements disposed therein, each of said multiplying elements being adapted to multiply the amplitude of a signal applied thereto by a value proportional to the amplitude of a respective signal sample delivered by said sampling means when said corresponding channel wave shape occupies a reference position in said sampling means; each of the plurality of multiplying elements of each of said channels being coupled to receive said respective one of the signal samples delivered to the associated channel; means in each of said channels for combining all of said multiplied signals produced by the multiplying elements therein and for delivering a corresponding combination signal; means in each of said transmission channels for multiplying the amplitude of the signals passing through said channel by a factor inversely proportional to the energy content of the corresponding wave shape; and means for sensing the signals delivered by all of said transmission channels to determine which one of said delivered signals has the greatest amplitude and for producing a signal identifying the one of said channels which delivers said greatest amplitude signal.

7. Apparatus as in claim 6 wherein said sampling means comprises a delay line having an input terminal and a plurality of taps therealong for delivering said plurality of discrete signal samples.

8. In a system for recognizing each of a plurality of different wave shapes, apparatus comprising; a plurality of transmission channels equal in number to the number of said different wave shapes, each of said channels corresponding to one of said wave shapes; sampling means having an input terminal for receiving any one of said wave shapes and in response thereto for delivering a plurality of discrete signal samples of said wave shape to all of said transmission channels; each of said channels having a plurality of multiplying elements disposed therein, each of said multiplying elements being adapted to multiply the amplitude of a signal applied thereto by a value proportional to the amplitude of a respective signal sample delivered by said sampling means when said corresponding channel wave shape occupies a reference position in said sampling means and inversely proportional to the energy content of said corresponding wave shape; each of the plurality of multiplying elements of each of said channels being coupled to receive said respective one of the signal samples delivered to the associated channel; means in each of said channels for combining all of said multiplied signals produced therein and for delivering a corresponding combination signal; and means for sensing the signals delivered by all of said transmission channels to determine which one of said delivered signals has the greatest amplitude and for producing a signal identifying the one of said channels which delivers said greatest amplitude signal.

9. In a system for recognizing each of a plurality of different wave shapes, apparatus comprising; a plurality of transmission channels equal in number to the number of said different wave shapes, each of said channels corresponding to one of said wave shapes; sampling means having an input terminal for receiving any one of said wave shapes and in response thereto for delivering a plurality of discrete signal samples of said wave shape to all of said transmission channels; each of said channels having a plurality of multiplying elements disposed therein, each of said multiplying elements being adapted to multiply the amplitude of a signal applied thereto by a value proportional to the amplitude of a respective signal sample delivered by said sampling means when said corresponding channel wave shape occupies a reference position in said sampling means; each of the plurality of multiplying elements of each of said channels being coupled to receive said respective one of the signal samples delivered to the associated channel; means in each of said channels for combining all of said multiplied signals produced by the multiplying elements therein and for delivering a corresponding combination signal; means in each of said transmission channels for multiplying the amplitude of said combination signal passing through said channel by a factor inversely proportional to the energy content of the corresponding wave shape and means for sensing the signals delivered by all of said transmission channels to determine which one of said delivered signals has the greatest amplitude and for producing a signal identifying the one of said channels which delivers said greatest amplitude signal.

10. In a system for recognizing each of a plurality of different wave shapes, apparatus comprising; a plurality of transmission channels equal in number to the number of said different wave shapes; each of said channels corresponding to one of said wave shapes; a delay line having an input terminal for receiving any one of said wave shapes and having a plurality of taps therealong for delivering a plurality of discrete signal samples of said wave shape to all of said transmission channels; each of said channels having a plurality of voltage dividers disposed therein, each of said voltage dividers being adapted to receive a respective one of the plurality of discrete signal samples delivered to the associated channel and to deliver an output signal representing the amplitude of the received signal sample multiplied by a factor proportional to the amplitude of the respective signal sample received by said voltage divider when said corresponding channel wave shape occupies a reference position in said delay line; each of the plurality of voltage dividers of each of said channels being coupled to receive said respective one of the signal samples delivered to the associated channel; means in each of said channels for adding the numerical magnitudes of all of the voltage divider output signals produced therein and for delivering a corresponding summation signal; means in each of said transmission channels for multiplying the amplitude of the signals passing through said channel by a factor inversely proportional to the energy content of the corresponding wave shape; and means for sensing the signals delivered by all of said transmission channels to determine which one of said delivered signals has the greatest amplitude and for producing a signal identifying the one of said channels which delivers said greatest amplitude signal.

11. Apparatus for recognizing each of a plurality of different symbols, comprising; means for generating electrical wave shapes characteristic of each symbol to be identified; a plurality of transmission channels equal in number to the number of said different symbols, each of said channels corresponding to one of said symbols; a delay line having an input terminal for receiving any one of said wave shapes and having a plurality of taps therealong for delivering a plurality of discrete signal samples of said wave shape to all of said transmission channels; each of said channels having a plurality of voltage dividers disposed therein, each of said voltage dividers being adapted to receive a respective one of the plurality of discrete signal samples delivered to the associated channel and to deliver an output signal representing the amplitude of the received signal sample multiplied by a factor proportional to the amplitude of the respective signal sample received by said voltage divider when said corresponding channel wave shape occupies a reference position in said delay line; each of the plurality of voltage dividers of each of said channels being coupled to receive said respective one of the signal samples delivered to the associated channel; means in each of said channels for adding the numerical magnitudes of all of the voltage divider output signals produced therein and for delivering a corresponding summation signal; means in each of said transmission channels for multiplying the amplitude of the signals passing through said channel by a factor inversely proportional to the energy content of the corresponding wave shape; and means for sensing the signals delivered by all of said transmission channels to determine which one of said delivered signals has the greatest amplitude and for producing a signal identifying the one of said channels which delivers said greatest amplitude signal.

12. Apparatus for recognizing each of a plurality of different symbols, comprising; means for generating electrical wave shapes characteristic of each symbol to be identified; means for limiting the maximum frequency present in each of said wave shapes; a plurality of transmission channels equal in number to the number of said different symbols, each of said channels corresponding to one of said symbols; a delay line having an input terminal for receiving any one of said wave shapes and having a plurality of taps therealong for delivering a plurality of discrete signal samples of said wave shape to all of said transmission channels; each of said channels having a plurality of voltage dividers disposed therein, each of said voltage dividers being adapted to receive a respective one of the plurality of discrete signal samples delivered to the associated channel and to deliver an output signal representing the amplitude of the received signal sample multiplied by a factor proportional to the amplitude of the respective signal sample received by said voltage divider when said corresponding channel wave shape occupies a reference position in said delay line; each of the plurality of voltage dividers of each of said channels being coupled to receive said respective one of the signal samples delivered to the associated channel; means in each of said channels for adding the numerical magnitudes of all of the voltage divider output signals produced therein and for delivering a corresponding summation signal; means in each of said transmission channels for multiplying the amplitude of the signals passing through said channel by a factor inversely proportional to the energy content of the corresponding wave shape; and means for sensing the signals delivered by all of said transmission channels to determine which one of said delivered signals has the greatest amplitude and for producing a signal identifying the one of said channels which delivers said greatest amplitude signal.

13. Apparatus as in claim 10 further including a gate coupled to receive the output signal of each of said transmission channels, each of said gates being adapted to prevent passage of a signal therethrough except when said gate is triggered by a gating signal; means adapted to receive said signal identifying the one of said channels which delivers the greatest output signal and in response thereto to deliver a distinct signal from said one channel to the corresponding gate; and means responsive to the leading edge of said one wave shape for delivering a gating signal to all of said gates when said wave shape occupies said reference position in said delay line.

14. In a system for recognizing each of a plurality of different wave shapes, apparatus comprising; a plurality of transmission channels equal in number to the number of said different wave shapes; each of said channels corresponding to one of said wave shapes; a delay line having an input terminal for receiving any one of said wave shapes and having a plurality of taps therealong for delivering a plurality of discrete signal samples of said wave shape to all of said transmission channels; each of said channels having a plurality of voltage dividers disposed therein, each of said voltage dividers being adapted to receive a respective one of the plurality of discrete signal samples delivered to the associated channel and to deliver an output signal representing the amplitude of the received signal sample multiplied by a factor proportional to the amplitude of the respective signal sample received by said voltage divider when said corresponding channel wave shape occupies a reference position in said delay line; each of the plurality of voltage dividers of each of said channels being coupled to receive said respective one of the signal samples delivered to the associated channel; means in each of said channels for adding the numerical magnitudes of all of the voltage divider output signals produced therein and for delivering a corresponding summation signal; means in each of said transmission channels for multiplying the amplitude of the signals passing through said channel by a factor inversely proportional to the energy content of the corresponding wave shape; a plurality of memory means coupled to receive the output signal of a respective one of each of said transmission channels, each of said memory means being adapted to store the largest signal delivered thereto and to be cleared in response to a reset signal; means for sensing the signal stored in all of said memory means to determine which one of said stored signals has the greatest amplitude and for producing a signal identifying the one of said memory means which stores said greatest amplitude signal; a plurality of gates responsive to the signal stored in a respective one of each of said memory means, each of said gates being adapted to prevent passage of a signal therethrough except when said gate is triggered by a gating signal; means adapted to receive said signal identifying the one of said memory means which stores the greatest signal and in response thereto to deliver a distinct signal from said one memory means to the corresponding gate; and means responsive to the leading edge of said one wave shape for delivering a reset signal to all of said memory means before said wave shape reaches said reference position in said delay line, and for delivering a gating signal to all of said gates after said wave shape passes said reference position.

15. Apparatus for detecting the leading edge of a wave shape comprising a delay line having an input terminal for receiving said wave shape and a plurality of taps therealong for sampling discrete points on a wave traveling along said line, a plurality of voltage dividers, each of said dividers being connected to a respective one of said taps, a subtracting means having a pair of input terminals and an output terminal and adapted to provide an output signal representing the difference between a pair of signals applied respectively to its input terminals, means for applying the signals delivered by at least one of said voltage dividers to one input terminal of said subtracting means, and means for applying the signals delivered by at least one of the remaining voltage dividers to the other input terminal of said subtracting means.

16. Apparatus for detecting the leading edge of a wave shape comprising a delay line having an input terminal for receiving said wave shape and at least three taps therealong for sampling at least three discrete points on a wave traveling along said line, three voltage dividers, each of said dividers being connected to a respective one of said taps, a subtracting means having a pair of input terminals and an output terminal and adapted to provide an output signal representing the difference between a pair of signals applied respectively to its input terminals, means for adding the signals delivered by two of said dividers and applying the resultant signal to one input terminal of said subtracting means, and means for applying the signal delivered by the other of said dividers to the other input terminal of said subtracting means, whereby the instant when the output signal of said subtracting means changes polarity is indicative of the presence of said leading edge.

17. Apparatus for presenting automatically an electrical identification of human-language symbols comprising means for generating an electrical waveshape characteristic of a symbol to be identified, a correlation network for each symbol to be identified, means for applying a waveshape from said means for generating simultaneously to all said correlation networks, and means for detecting which of said correlation networks has the largest output to provide an electrical identification of said symbol.

18. Apparatus for presenting automatically an electrical identification of human-language symbols comprising means for generating an electrical waveshape characteristic of a symbol to be identified, a delay line to which output from said means for generating is applied, a plurality of correlation networks, one for each different symbol to be identified, means for coupling all said correlation networks to said delay line to sample the contents thereof, and means for detecting which of said correlation networks has the largest output to provide an electrical identification of said symbol.

19. Apparatus as recited in claim 18 wherein each said correlation networks includes a plurality of voltage dividers each having a voltage tapoff point, the arrangement pattern of said voltage tapoff points being in accordance with the waveshape of the symbol to be identified by said correlation filter, and means for algebraically adding the voltages from all said voltage tapoff points.

20. Apparatus as recited in claim 18 wherein said means for detecting includes a plurality of gates, means for coupling a different one of said gates to a different correlation network, and means for opening said plurality of gates during an optimum time for sampling an electrical waveshape in said delay line by said correlation networks.

21. Apparatus for presenting automatically an electrical identification of human language symbols comprising means for generating an electrical waveshape characteristic of a symbol to be identified, a delay line to which output from said means for generating is applied, a plurality of correlation networks, one for each different symbol to be identified, each of said correlation networks including a plurality of inputs, means to algebraically add voltages applied to said inputs and an output to which the sum obtained is applied, means for coupling all the inputs of said correlation networks to said delay line to sample the contents thereof, a plurality of difference means for establishing the difference between two inputs, a different one of said means being associated with a different one of said correlation networks, means coupled to all said correlation network outputs for detecting the peak voltage amplitude of all said correlation network outputs, means for applying substantially said peak amplitude to one input of said plurality of difference means, means for applying the output of each correlation network to the second output of an associated difference means wherein the output of one of said difference means exceeds all of the other outputs, a plurality of gates, means for coupling a different one of said gates to the output of a different one of said difference means, and means responsive to a waveshape portion in said delay line for opening said plurality of gates during an optimum time for sampling an electrical waveshape in said delay line by said correlation networks whereby one of said gates provides an output which is an electrical identification of said symbol.

22. Apparatus as recited in claim 21 wherein said delay line has a plurality of sampling points spaced therealong, each of said correlation networks includes a plurality of voltage dividers each having a voltage tapoff point, each voltage divider being coupled to a different one of said sampling points, the arrangement pattern of said voltage tapoff points being in accordance with the waveshape of the symbol to be identified by said correlation network, and means for algebraically adding the voltages from all said tapoff points.

23. Apparatus as recited in claim 22 wherein said means for opening said gates during an optimum time for sampling an electrical waveshape in said delay line by said correlation network includes another correlation network including at least three voltage dividers coupled to the first three sample points at the input portion of said delay line, said voltage dividers having voltage tapoff points positioned in accordance with the rising characteristic of the leading edge of a waveshape, means for adding the voltages derived from the first two tapoff points, means for subtracting the sum from the voltage derived from the third tapoff point, and means responsive to this difference being substantially zero for producing a signal to open said gates at a time thereafter required to transfer a complete waveshape into said delay line.

24. Apparatus for presenting automatically an electrical identification of human-language symbols comprising means for generating an electrical waveshape characteristic of a symbol to be identified, a delay line to switch output from said means for generating is applied, a plurality of correlation networks, one for each different symbol to be identified, means for coupling all said correlation networks to said delay line to sample the contents thereof, a plurality of means for detecting and storing the peak amplitude of a voltage applied thereto, each of which is coupled to receive the output of a different one of said correlation networks, a separate difference means coupled to each of said means for detecting and storing to provide an output only if the amplitude of the signal applied thereto exceeds all the others, a plurality of gates, a different one of which is coupled to a different one of said difference means, and means for opening said gates after an optimum waveshape sampling time in said delay by said correlation network whereby one of said gates provides an output electrically identifying said symbol.

25. Apparatus as recited in claim 24 wherein said delay line has a plurality of sampling points spaced therealong, each of said correlation networks includes a plurality of voltage dividers each having a voltage tapoff point, each voltage divider being coupled to a different one of said sampling points, the arrangement pattern of said voltage tapoff points being in accordance with the waveshape of the symbol to be identified by said correlation filter, and means for algebraically adding the voltages from all said tapoff points.

26. Apparatus as recited in claim 25 wherein said means for opening said gates after an optimum time for sampling a waveshape in said delay line includes another correlation network including at least three voltage dividers coupled to the first three sample points at the input portion of said delay line, said voltage dividers having voltage tapoff points positioned in accordance with the rising characteristic of the leading edge of a waveshape, means for adding the voltages derived from the first two tapoff points, means for subtracting the sum from the voltage derived from the third tapoff point, and means responsive to this difference being substantially zero for producing a signal to open said gates at a time thereafter required for a complete waveshape to be sampled at all said sampling points.

27. In a system for recognizing each of a plurality of different signals, each representing a different functional relationship between a first and a second varying quantity, apparatus comprising: a plurality of transmission channels; distributing means having an input terminal for receiving any one of said different signals and having a plurality of output terminals for delivering the same to all of said transmission channels; each of said channels having data stored therein representing different functional relationships between a third and a fourth varying quantity; each of said channels being adapted to modify the signal transmitted therethrough in accordance with the data stored therein; means for sensing the signals delivered by all of said transmission channels to determine which one of said delivered signals has an amplitude that is mathematically an extreme with respect to the amplitudes of the other of said delivered signals; and means for producing a signal identifying the one of said channels which delivers said extreme amplitude signal.

28. In a system for recognizing each of a plurality of different signals, each representing a different functional relationship between a first and a second varying quantity, apparatus comprising: a plurality of transmission channels; distributing means having an input terminal for receiving any one of said different signals and having a plurality of output terminals for delivering the same to all of said transmission channels; each of said channels having data stored therein representing different functional relationships between a third and a fourth varying quantity; each of said channels being adapted to modify the signal transmitted therethrough in accordance with the data stored therein; and means for sensing the signals delivered by all of said transmission channels to determine which one of said delivered signals has the greatest amplitude and for producing a signal identifying the one of said channels which delivers said greatest amplitude signal.

29. Apparatus for recognizing each of a plurality of different wave shapes, comprising a plurality of networks, each of said networks being adapted to store data representing different functional relationships between a first and a second quantity, each of said networks being further adapted to receive a respective one of said wave shapes at input terminals thereof and in response to said respective wave shape to deliver an output signal having an amplitude that is mathematically an extreme with respect to the amplitudes of the output signals of the other of said networks, and distributing means for receiving any one of said different wave shapes and for applying said one wave shape to said input terminals of all of said networks.

30. Apparatus as in claim 29 wherein said extreme is a maximum.

31. Apparatus as in claim 30 further including means for producing a signal identifying the one of said networks which delivers said maximum signal.

32. Apparatus as in claim 29 wherein said distributing means comprises a delay line having an input terminal and a plurality of taps therealong.

33. Apparatus as in claim 29 further including a plurality of gates, each of said gates coupled to receive the output signal of each of said networks, each of said gates being adapted to prevent passage of a signal therethrough except when said gate is triggered by a gating signal; means adapted to receive a signal identifying the one of said networks which delivers said extreme magnitude signal and in response thereto to deliver a distinct signal from said one network to the corresponding gate; and means responsive to the leading edge of said one wave shape for delivering a gating signal to all of said gates when said wave shape occupies a predetermined position in said distributing means.

34. In a system for recognizing each of a plurality of different wave shapes, apparatus comprising: a plurality of transmission channels equal in number to the number of said different wave shapes, each of said channels corresponding to one of said wave shapes; sampling means having an input terminal for receiving any one of said wave shapes and in response thereto for delivering a plurality of signal samples of said wave shape to all of said transmission channels; each of said channels having a plurality of multiplying elements disposed therein, each of said multiplying elements being adapted to multiply the amplitude of a signal applied thereto by a value related to the amplitude of a respective signal sample delivered by said sampling means when said corresponding channel wave shape occupies a reference position in said sampling means; each of the plurality of multiplying elements of each of said channels being coupled to receive a respective one of the signal samples delivered to the associated channel; means in each of said channels for combining all of said multiplied signals produced by the multiplying elements therein and for delivering a corresponding combination signal; means for sensing the signals delivered by all of said transmission channels to determine which one of said delivered signals has an amplitude that is mathematically an extreme with respect to the amplitudes of the other of said delivered signals; and means for producing a signal identifying the one of said channels which delivers said extreme amplitude signal.

35. In a system for recognizing each of a plurality of different wave shapes, apparatus comprising: a plurality of transmission channels equal in number to the number of said different wave shapes, each of said channels corresponding to one of said wave shapes; sampling means having an input terminal for receiving any one of said wave shapes and in response thereto for delivering a plurality of signal samples of said wave shape to all of said transmission channels; each of said channels having a plurality of multiplying elements disposed therein, each of said multiplying elements being adapted to multiply the amplitude of a signal applied thereto by a value proportional to the amplitude of a respective signal sample delivered by said sampling means when said corresponding channel wave shape occupies a reference position in said sampling means; each of the plurality of multiplying elements of each of said channels being coupled to receive a respective one of the signal samples delivered to the associated channel; means in each of said channels for combining all of said multiplied signals produced by the multiplying elements therein and for delivering a corresponding combination signal; and means for sensing the signals delivered by all of said transmission channels to determine which one of said delivered signals has the greatest amplitude and for producing a signal identifying the one of said channels which delivers said greatest amplitude signal.

36. Apparatus as in claim 35 wherein said sampling means comprises a delay line having an input terminal and a plurality of taps therealong for delivering said plurality of signal samples.

37. Apparatus as in claim 35 wherein said multiplying elements are voltage dividers.

38. Apparatus as in claim 36 further including means coupled to said sampling means and adapted to limit the maximum frequency present in the wave shapes applied thereto.

39. Apparatus as in claim 34 wherein said means in each of said channels for combining all of said multiplied signals produced by the multiplying elements therein and for delivering a corresponding combination signal comprises: positive summing means for delivering an output signal corresponding to the summation of the amplitudes of the multiplied signals produced by the multiplying elements of said channel which deliver positive signals when the wave shape corresponding to said channel occupies its reference position in said sampling means; negative summing means for delivering an output signal corresponding to the summation of the amplitudes of the multiplied signals produced by the multiplying elements of said channel which deliver negative signals when the wave shape corresponding to said channel occupies its reference position in said sampling means; polarity inverting means coupled to receive and invert the polarity of one of the output signals of said positive and negative summing means; and means for delivering a combination signal corresponding to the sum of the inverted signal delivered by said inverting means and the output signal of the summing means which is not coupled to said inverting means.

40. Apparatus for providing automatically an electrical identification of human-language symbols comprising means for generating an electrical wave shape characteristic of one of said symbols to be recognized, a plurality of networks, each of said networks being adapted to store data representing different functional relationships between a first and a second quantity, each of said networks being further adapted to receive a respective one of said wave shapes at input terminals thereof and in response to said respective wave shape to deliver an output signal having an amplitude that is mathematically an extreme with respect to the amplitudes of the output signals of the other of said networks, and distributing means for receiving any one of said different wave shapes and for applying said one wave shape to said input terminals of all of said networks.

41. Apparatus for providing automatically an electrical identification of human-language symbols comprising scanning means responsive to any one of said symbols for generating an electrical wave shape characteristic of the shape of said symbol, a plurality of storage devices each adapted to store data representing a wave shape generated by said scanning means in response to a respective one of said symbols to be identified, correlating means for correlating a received wave shape with the data stored in each of said storage devices, and means for coupling said correlating means to receive the wave shape generated by said scanning means.

References Cited in the file of this patent

UNITED STATES PATENTS

| | | |
|---|---|---|
| 2,615,992 | Flory | Oct. 28, 1952 |
| 2,616,983 | Zworykin | Nov. 4, 1952 |
| 2,730,700 | Serrell | Jan. 10, 1956 |

OTHER REFERENCES

Magnetic Shift Register Correlator by Kelner et al., August 1956, Electric Magazine, pp. 172–175.